United States Patent
Murakami

(10) Patent No.: US 6,356,651 B2
(45) Date of Patent: *Mar. 12, 2002

(54) METHOD AND APPARATUS FOR RECOGNIZING IRRADIATION FIELDS ON RADIATION IMAGES

(75) Inventor: Masayuki Murakami, Kanagawa-ken (JP)

(73) Assignee: Fuji Photo Film Co., Ltd., Kanagawa-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/050,353

(22) Filed: Mar. 31, 1998

(30) Foreign Application Priority Data

Mar. 31, 1997 (JP) ................................................ 9-079696

(51) Int. Cl.[7] .................................................. G06K 9/00
(52) U.S. Cl. ........................................ 382/128; 128/922
(58) Field of Search ............................ 382/6, 132, 128, 382/199, 131, 281, 291, 103, 154, 129, 130; 378/62; 250/484

(56) References Cited

U.S. PATENT DOCUMENTS

| 4,258,264 A | * | 3/1981 | Kotera et al. ................ 250/484 |
| 4,967,079 A | * | 10/1990 | Shimura ..................... 250/586 |
| 4,995,093 A | * | 2/1991 | Kotera et al. .................. 382/6 |
| 5,651,042 A | * | 7/1997 | Dewaele ..................... 378/62 |
| 5,901,240 A | * | 5/1999 | Leo et al. ................... 382/132 |
| 5,960,102 A | * | 9/1999 | Van Eeuwijk et al. ....... 382/128 |

* cited by examiner

Primary Examiner—Leo Boudreau
Assistant Examiner—Abolfazl Tabutabai
(74) Attorney, Agent, or Firm—Sughrue Mion, PLLC

(57) ABSTRACT

Edge candidate points are detected with respect to radial straight lines, which have been set with respect to a predetermined point lying in a radiation image. A predetermined number of reference candidate lines are detected by the utilization of Hough transform with respect to the edge candidate points. It is determined that the region surrounded by the reference candidate lines is the irradiation field. The irradiation field on a radiation image is thereby recognized accurately. A blackening process is carried out on the region outside of the irradiation field, which has thus been determined.

24 Claims, 10 Drawing Sheets

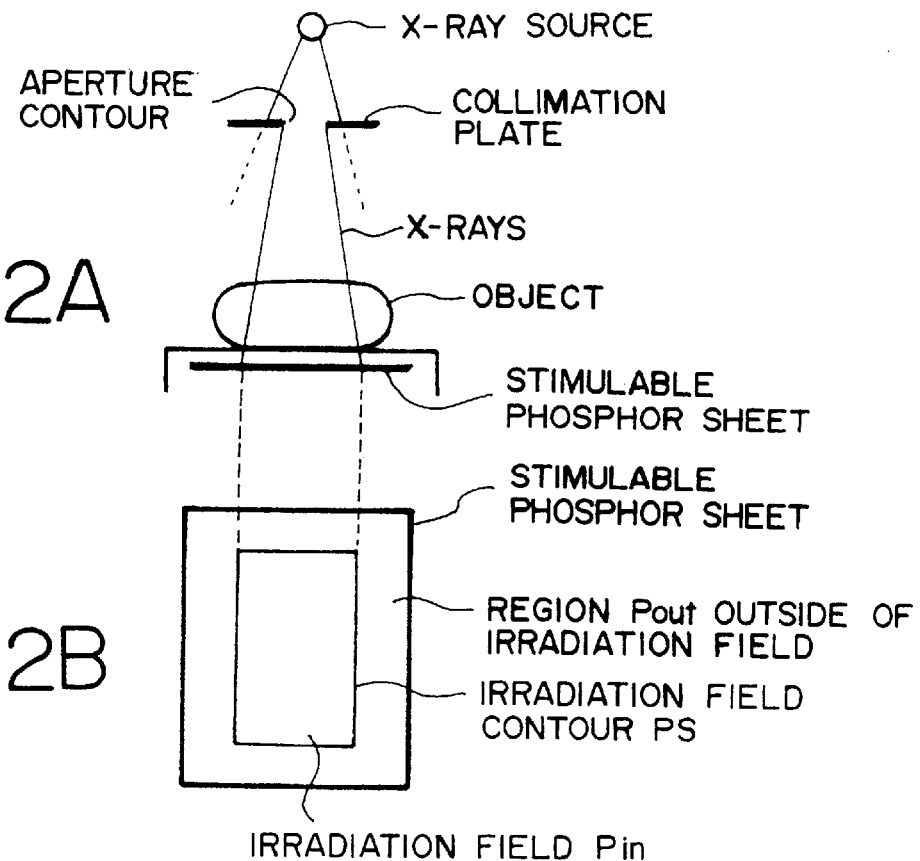

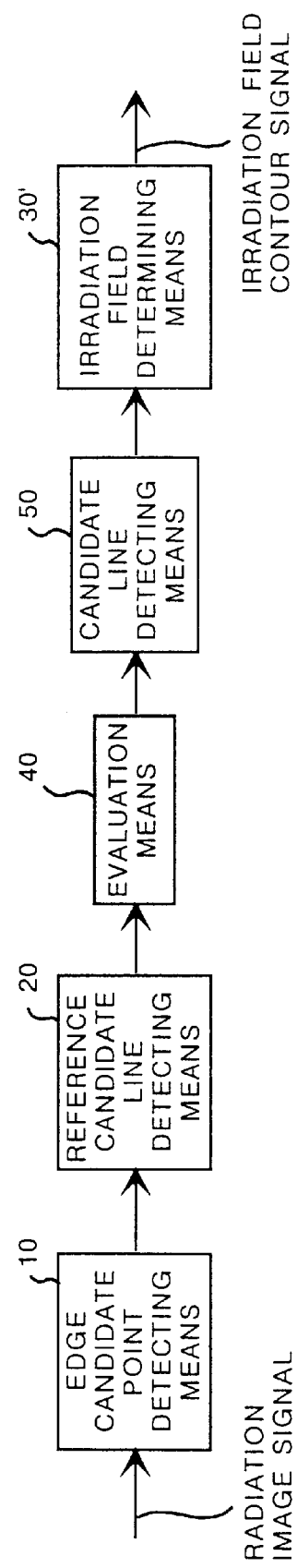

METHOD AND APPARATUS FOR RECOGNIZING IRRADIATION FIELDS ON RADIATION IMAGES

BACKGROUND OF THE INVENTION

1. Field of the Invention

This invention relates to a method of recognizing an irradiation field on a radiation image, and an apparatus for carrying out the method. This invention also relates to a blackening processing method, and an apparatus for carrying out the blackening processing method.

2. Description of the Prior Art

Techniques for reading out a recorded radiation image in order to obtain an image signal, carrying out appropriate image processing on the image signal, and then reproducing a visible image having good image quality by use of the processed image signal have heretofore been known in various fields. For example, as such techniques, the applicant proposed various radiation image recording and reproducing systems which use stimulable phosphor sheets.

When a radiation image of an object, such as a living body, is recorded on a recording medium, such as X-ray film or a stimulable phosphor sheet, it is desirable that adverse effects of radiation upon the living body can be kept as small as possible. Also, if object portions not related to a diagnosis, or the like, are exposed to radiation, the radiation will be scattered by such portions to the portion that is related to a diagnosis, or the like, and the image quality will be adversely affected by the scattered radiation. Therefore, when a radiation image is recorded on the recording medium, a collimation plate made from lead, or the like, is often used in order to limit the irradiation field to an area smaller than the overall recording region of the recording medium, such that radiation may be irradiated only to that portion of the object, the image of which is to be used.

In cases where a radiation image is recorded on a recording medium, such as a stimulable phosphor sheet, by using a collimation plate, an image of an object, or the like, is recorded in a region (i.e., an irradiation field) inward from the aperture contour of the irradiation field stop. Also, a region outward from the aperture contour of the irradiation field stop (i.e., a region outside of the irradiation field) is not exposed to the radiation. Therefore, an irradiation field contour on the image, which contour corresponds to the aperture contour of the irradiation field stop, constitutes edge lines in the image.

In cases where an image signal is detected from the recording medium, on which an image has been recorded within only the irradiation field, and image processing is carried out on the image signal, the image processing, such as gradation processing, may be carried out on only the image signal components of the image signal, which correspond to the region inside of the irradiation field. In this manner, the amount of the processing can be reduced markedly, the load of the processing can be kept small, and the processing speed can be kept high.

The region outside of the irradiation field is not exposed to the radiation. Therefore, in cases where the image is a negative image recorded on medical X-ray film, the image density of the region outside of the irradiation field becomes approximately lowest on the image. By way of example, when the medical X-ray film is set on a viewing screen and the transmission image with light produced by a fluorescent lamp is seen, the region having the lowest level of image density becomes the very bright region. Therefore, in particular, the portion of the irradiation field, which portion is close to the region outside of the irradiation field, cannot be seen clearly due to dazzling effects of the bright region outside of the irradiation field. Also, in cases where an electric image signal is detected from the recording medium, on which an image has been recorded within only the irradiation field, and a visible image is reproduced from the image signal and displayed on an image displaying device, such as a cathode ray tube (CRT) display device, the region outside of the irradiation field has the highest level of luminance, and therefore the image within the irradiation field cannot be seen clearly.

Accordingly, in the radiation image recording and reproducing systems, a process for forcibly replacing the image signal values, which correspond to the region outside of the irradiation field, by image signal values representing the highest level of image density (or the lowest level of luminance) is carried out. The process is ordinarily referred to as the blackening process. It is important that the irradiation field contour, which serves as the spatial reference for the blackening process, can be recognized accurately.

Specifically, if a contour, which is smaller than the correct irradiation field contour (i.e., which is positioned more inward than the correct irradiation field contour), is recognized as the irradiation field contour by mistake, the image portion, which is to be used as the one within the irradiation field, will be subjected to the blackening process as being the one outside of the irradiation field, and therefore the image information at the image portion cannot be seen on the image obtained from the blackening process. Also, if a contour, which is larger than the correct irradiation field contour (i.e., which is positioned more outward than the correct irradiation field contour), is recognized as the irradiation field contour by mistake, the image portion, which has the lowest level of image density (or the highest level of luminance), will remain unblackened, and the effects to be obtained from the blackening process cannot be obtained.

Accordingly, various techniques for accurately carrying out the process for recognizing the irradiation field (contour) have been proposed.

For example, techniques have been proposed, wherein an irradiation field contour is determined by utilizing the characteristics in that the irradiation field contour constitutes the edge lines in the image, at which the image density changes sharply, and finding a portion, at which the value of the image signal changes sharply. One of such techniques for determining the edge lines has been proposed in U.S. Pat. No. 4,967,079. With the technique proposed in U.S. Pat. No. 4,967,079, the edge lines are determined by (a) setting a plurality of radial straight lines, which extend from a predetermined point in the image (e.g., a center point in the image) toward ends of the image, (b) detecting an edge candidate point, at which the different in image signal value is large, from the image signal values corresponding to positions along each of the radial straight lines, a plurality of edge candidate points being thereby detected with respect to the plurality of the radial straight lines, and (c) determining the edge lines in accordance with the thus detected edge candidate points.

However, with the aforesaid technique for recognizing the edge lines, i.e. the irradiation field contour, in accordance with the edge candidate points having been obtained with respect to the radial directions, an irradiation field contour, which coincides with the actual irradiation field contour, cannot necessarily be obtained. In such cases, the problems occur in that an image portion, which is to be used, is blackened with the blackening process, or in that an image portion, which has the lowest level of image density and is to be blackened, remains unblackened.

SUMMARY OF THE INVENTION

The primary object of the present invention is to provide a method of recognizing an irradiation field on a radiation image, wherein the accuracy, with which the irradiation field is recognized, is kept to be higher than the accuracy of a conventional technique for recognizing an irradiation field.

Another object of the present invention is to provide an apparatus for carrying out the method of recognizing an irradiation field on a radiation image.

A further object of the present invention is to provide a blackening processing method for a radiation image, wherein the accuracy, with which a blackening process is carried out, is kept to be higher than the accuracy of a conventional technique for the blackening process.

A still further object of the present invention is to provide an apparatus for carrying out the blackening processing method for a radiation image.

A method and apparatus for recognizing an irradiation field on a radiation image in accordance with the present invention are characterized by detecting edge candidate points with respect to radial straight lines, which have been set with respect to a predetermined point lying in the image, detecting a predetermined number of reference candidate lines by the utilization of Hough transform with respect to the edge candidate points, and determining that the region surrounded by the reference candidate lines is the irradiation field.

Specifically, the present invention provides a method of recognizing an irradiation field on a radiation image, in which an image signal representing a radiation image is obtained, the radiation image having been recorded by use of a collimation plate and having an irradiation field thereon, and a process for recognizing the irradiation field is carried out, the irradiation field being recognized in accordance with the image signal, the method comprising the steps of:

i) setting a plurality of radial straight lines extending from a predetermined point, which lies within the irradiation field, toward ends of the radiation image, ii) detecting an edge candidate point with respect to each of the set radial straight lines and in accordance with values of the image signal, which correspond to positions located along the radial straight line, the edge candidate point being considered to constitute a contour of the irradiation field on the radial straight line, a plurality of edge candidate points being thereby detected with respect to the plurality of the radial straight lines, iii) detecting a curved line, which may be represented by Formula (1), with respect to each of the edge candidate points:

$$\rho = xi \cos \theta + yi \sin \theta \quad (1)$$

wherein coordinates of each of the edge candidate points on an orthogonal coordinate system having been set in the plane of the radiation image are represented by (xi, yi), and xi and yi are taken as fixed values, a plurality of curved lines being thereby found with respect to the plurality of the edge candidate points, iv) detecting points of intersection ($\rho j$, $\theta j$), at which the detected curved lines intersect with one another, the number of the curved lines, which intersect with one another at each of the points of intersection ($\rho j$, $\theta j$), being then counted with respect to each of the points of intersection ($\rho j$, $\theta j$), v) extracting a predetermined number of the points of intersection ($\rho j$, $\theta j$) in the order of decreasing count value, vi) detecting a reference candidate line on the orthogonal coordinate system, the reference candidate line corresponding to each of the extracted points of intersection ($\rho j$, $\theta j$) and being defined by Formula (2):

$$\rho j = x \cos \theta j + y \sin \theta j \quad (2)$$

a plurality of the reference candidate lines, which correspond to the extracted points of intersection ($\rho j$, $\theta j$), being thereby detected, and vii) determining that a region surrounded by the plurality of the reference candidate lines defined by Formula (2) is the irradiation field.

By way of example, as the predetermined point, from which the radial straight lines extend, the physical center point in the image may be employed. This is because it is not popular that the region outside of the irradiation field is located at the center portion of the image. However, in the method of recognizing an irradiation field on a radiation image in accordance with the present invention (and in the apparatus for carrying out the method, which will be described later), the predetermined point need not necessarily be set at the center point in the image and may be set at one of the other points in the image.

The detection of the edge candidate point with respect to each radial straight line may be carried out in the manner described below. Specifically, a calculation may be made to find the difference between the image signal values, which correspond to two adjacent picture elements lying on the radial straight line, and a plurality of such differences may be calculated successively. Two adjacent picture elements, which are associated with the largest difference, may thereby be detected, and one of the two adjacent picture elements, which has a smaller image signal value than the other, may be detected as the edge candidate point.

As the radiation image, one of various kinds of images may be employed. For example, the radiation image may be an image (i.e., an original image), which has been read out from the recording medium. Alternatively, the radiation image may be an image having been obtained from a predetermined normalizing process, which is carried out such that the image density, the gradation, or the like, may fall within a predetermined range. As another alternative, the radiation image may be a reduced image, which is obtained by thinning out the picture elements in the original image. As a further alternative, the radiation image may be a preliminary read-out image having been obtained from a preliminary read-out operation, which is carried out before a final read-out operation for obtaining the original image is carried out and which is carried out for picture elements that are larger than those of the final read-out operation.

As described above, it is determined that the region surrounded by the plurality of the reference candidate lines defined by Formula (2) is the irradiation field. At this time, it may occur that two or more such closed regions are formed. In such cases, the areas of the closed regions other than a single certain closed region are markedly small. Therefore, in such cases, a single irradiation field can be determined by calculating the areas of the closed regions and comparing the calculated areas with one another.

The aforesaid predetermined number, which determines the number of the extracted reference candidate lines, should be equal to at least the number of the linear sides, which constitute the irradiation field contour.

The method of recognizing an irradiation field on a radiation image in accordance with the present invention may be modified in the manner described below. Specifically, evaluation utilizing a predetermined evaluation function may be made with respect to each of the reference candidate lines defined by Formula (2), predetermined candidate lines may be detected in accordance with the results of the evaluation, the predetermined candidate lines being detected from the reference candidate lines or in lieu of the reference candidate lines, and it may be determined that a region surrounded by the predetermined candidate lines, in lieu of the reference candidate lines, is the irradiation field.

In the modification described above, the evaluation utilizing the predetermined evaluation function may be made by making a judgment for each of the reference candidate lines defined by Formula (2) as to whether a predetermined representative point, which has been set previously as a point lying on the irradiation field contour, lies or does not lie on the reference candidate line, and the predetermined candidate lines may be the reference candidate lines, which are among the reference candidate lines defined by Formula (2) and for which it has been judged that the corresponding predetermined representative points lie thereon.

The term "predetermined representative point having been set previously as a point lying on a irradiation field contour" as used herein means the point, which has a strong probability of lying on the irradiation field contour on the actual image. For example, the predetermined representative point may be the point, at which the aforesaid difference between the image signal values corresponding to two adjacent picture elements takes a markedly large value.

In the modification described above, alternatively, the evaluation utilizing the predetermined evaluation function may be made by shifting and/or rotating each of the reference candidate lines, which are defined by Formula (2), within the range of ±m picture elements and ±α degrees around the reference candidate line, thereby setting $\{(2m+1)(2\alpha+1)-1\}$ number of transformed candidate lines with respect to each of the reference candidate lines, calculating differentiated values with respect to each candidate line, which is among the reference candidate lines and the transformed candidate lines having been set for the reference candidate lines, and calculating a mean value of the differentiated values with respect to each candidate line, the mean value being taken with respect to the direction, along which the candidate line extends, and the predetermined candidate lines may be a predetermined total number of the reference candidate lines and the transformed candidate lines, which have been selected in the order of decreasing mean value of differentiated values, in lieu of the reference candidate lines defined by Formula (2).

The value of m and the value of α should preferably be set such that, for example, m=1 (picture element) and $\alpha=1/(x^2+y^2)^{1/2}$ (degree). In this formula, x and y are the values representing the size of the reduced image, which is expressed with the number of picture elements (x picture elements x y picture elements). For example, in cases where the size of the reduced image is 100 picture elements x 80 picture elements, x=100 (picture elements), and y=80 (picture elements). Therefore, in such cases, m=1 (picture element), and $\alpha=1/(100^2+80^2)^{1/2}=7.8\times10^{-3}$ (degree).

In cases where the scale of reduction falls within the range of 1/18 to 1 (scale of enlargement=1 to 18), the value of the reciprocal of the scale of reduction (i.e., the same value as the scale of enlargement) may be employed as the value of m and the value of α. For example, in cases where the scale of reduction is 1/9, the reciprocal (=9) of 1/9 may be employed such that m=9 (picture elements) and α=9 (degrees).

The term "differentiated value with respect to each candidate line" as used herein for the evaluation function described above means the value of difference between the image signal components representing two picture elements, which stand facing each other with the candidate line intervening therebetween. A large difference value represents that the difference in image density (or in luminance) between the two picture elements is large, and that an edge in the image lies between the two picture elements. As illustrated in FIG. 9A, a plurality of sets of the two picture elements, which stand facing each other with the candidate line intervening therebetween, are located in the direction, along which the candidate line extends. Therefore, a plurality of differentiated values are obtained with respect to the plurality of the sets of the two picture elements, the sets being located in the direction, along which the candidate line extends. The differentiated values having been obtained with respect to the sets of the two picture elements, the sets being located in the direction, along which the candidate line extends, are added to one another, and the thus calculated sum is divided by the number of the sets of the two picture elements. In this manner, the mean value described above is calculated. A large mean value represents a strong probability that the candidate line will be the actual edge in the radiation image, and the edge, which is associated with the largest difference in image density (or in luminance), is the line constituting the irradiation field contour.

In the modification described above, as another alternative, the evaluation utilizing the predetermined evaluation function may be made by shifting and/or rotating each of the reference candidate lines, which are defined by Formula (2), within the range of ±m picture elements and ±α degrees around the reference candidate line, thereby setting $\{(2m+1)(2\alpha+1)-1\}$ number of transformed candidate lines with respect to each of the reference candidate lines, finding directions of image density gradient vectors with respect to each candidate line, which is among the reference candidate lines and the transformed candidate lines having been set for the reference candidate lines, and calculating an entropy of the directions of image density gradient vectors with respect to each candidate line, the entropy being taken with respect to the direction, along which the candidate line extends, and the predetermined candidate lines may be a predetermined total number of the reference candidate lines and the transformed candidate lines, which have been selected in the order of increasing entropy, in lieu of the reference candidate lines defined by Formula (2).

The term "image density gradient vector with respect to each candidate line" as used herein for the evaluation function described above means the vector directed from each of picture elements, which are located on one side of the candidate line, toward the direction, in which the gradient of the image density (i.e., the value of difference in image signal value) is largest. An index value representing the direction, to which the image density gradient vector is directed, is calculated. As the index value, for example, the sine value (sin β) of an angle β, which is made between the direction of the image density gradient vector and the direction that is normal to the candidate line, may be employed. As illustrated in FIG. 9B, with respect to the directions of image density gradient vectors from the picture elements located in the direction, along which the candidate line extends, a histogram of the index values is formed. Thereafter, the value of entropy, $-\Sigma\{(Pi)\log Pi\}$, is calculated from a probability density Pi of the histogram. A small entropy represents that the directions of image density gradient vectors are directed in the same direction. Therefore, there is a strong probability that the candidate line, which is associated with a small entropy, will be the line constituting the actual irradiation field contour on the radiation image.

In cases where the function for calculating the entropy is employed as the evaluation function, the evaluation is made in accordance with whether the directions of image density gradient vectors are or are not directed in the same direction. Therefore, the evaluation function utilizing the entropy can be employed only in cases where the lines constituting the irradiation field contour are the straight lines. The evaluation function utilizing the entropy cannot be employed in cases where the lines constituting the irradiation field contour are circular arc lines or curved lines.

The term "image density gradient vector" as used herein is not limited to the cases where the image signal is of the type representing the image density values. The term "image density gradient vector" as used herein broadly embraces the gradient vectors based upon image signals, which represent gray levels and luminous levels, including the image density values and luminance values.

The present invention also provides an apparatus for carrying out the method of recognizing an irradiation field on a radiation image in accordance with the present invention. Specifically, the present invention also provides an apparatus for recognizing an irradiation field on a radiation image, in which an image signal representing a radiation image is obtained, the radiation image having been recorded by use of a collimation plate and having an irradiation field thereon, and a process for recognizing the irradiation field is carried out, the irradiation field being recognized in accordance with the image signal, the apparatus comprising:

i) an edge candidate point detecting means for setting a plurality of radial straight lines extending from a predetermined point, which lies within the irradiation field, toward ends of the radiation image, and detecting an edge candidate point with respect to each of the set radial straight lines and in accordance with values of the image signal, which correspond to positions located along the radial straight line, the edge candidate point being considered to constitute a contour of the irradiation field on the radial straight line, a plurality of edge candidate points being thereby detected with respect to the plurality of the radial straight lines, ii) a reference candidate line detecting means for:

detecting a curved line, which may be represented by Formula (1), with respect to each of the edge candidate points having been detected by the edge candidate point detecting means:

$$\rho = xi \cos\theta + yi \sin\theta \quad (1)$$

wherein coordinates of each of the edge candidate points on an orthogonal coordinate system having been set in the plane of the radiation image are represented by (xi, yi), and xi and yi are taken as fixed values, a plurality of curved lines being thereby found with respect to the plurality of the edge candidate points, detecting points of intersection (ρj, θj), at which the detected curved lines intersect with one another, the number of the curved lines, which intersect with one another at each of the points of intersection (ρj, θj), being then counted with respect to each of the points of intersection (ρj, θj), extracting a predetermined number of the points of intersection (ρj, θj) in the order of decreasing count value, and detecting a reference candidate line on the orthogonal coordinate system, the reference candidate line corresponding to each of the extracted points of intersection (ρj, θj) and being defined by Formula (2):

$$\rho j = x \cos\theta j + y \sin\theta j \quad (2)$$

a plurality of the reference candidate lines, which correspond to the extracted points of intersection (ρj, θj), being thereby detected, and iii) an irradiation field determining means for determining that a region surrounded by the plurality of the reference candidate lines defined by Formula (2), which have been detected by the reference candidate line detecting means, is the irradiation field.

The apparatus for recognizing an irradiation field on a radiation image in accordance with the present invention may be modified in the manner described below. Specifically, the apparatus may further comprise:

an evaluation means for making evaluation, which utilizes a predetermined evaluation function, with respect to each of the reference candidate lines defined by Formula (2), which have been detected by the reference candidate line detecting means, and a candidate line detecting means for detecting predetermined candidate lines in accordance with the results of the evaluation having been made by the evaluation means, the predetermined candidate lines being detected from the reference candidate lines or in lieu of the reference candidate lines, and the irradiation field determining means may determine that a region surrounded by the predetermined candidate lines, in lieu of the reference candidate lines, is the irradiation field.

The evaluation means evaluates the eligibility of each of the reference candidate lines defined by Formula (2), which have been detected by the reference candidate line detecting means, for the irradiation field contour or the conformity of each reference candidate line to the irradiation field contour. The candidate line detecting means detects the predetermined candidate lines, which have a high eligibility for the irradiation field contour or a high conformity to the irradiation field contour, i.e. which have at least the same level of probability of constituting the irradiation field contour as the reference candidate lines or a higher level of probability of constituting the irradiation field contour than the reference candidate lines.

In the modification described above, the evaluation means may make a judgment for each of the reference candidate lines defined by Formula (2) as to whether a predetermined representative point, which has been set previously as a point lying on the irradiation field contour, (or a predetermined representative point having been set by the evaluation means itself) lies or does not lie on the reference candidate line, and the candidate line detecting means may detect, as the predetermined candidate lines, the reference candidate lines, which are among the reference candidate lines defined by Formula (2) and for which it has been judged that the corresponding predetermined representative points lie thereon.

The term "predetermined representative point having been set previously as a point lying on a irradiation field contour" as used herein means the point, which has a strong probability of lying on the irradiation field contour on the actual image. For example, the predetermined representative point may be the point, at which the aforesaid difference between the image signal values corresponding to two adjacent picture elements takes a markedly large value.

In the modification described above, alternatively, the evaluation means may comprise:

a) a transformed candidate line setting means for shifting and/or rotating each of the reference candidate lines, which are defined by Formula (2), within the range of ±m picture elements and ±α degrees around the reference candidate line, and thereby setting $\{(2m+1)(2\alpha+1)-1\}$ number of-transformed candidate lines with respect to each of the reference candidate lines, and b) an evaluation value calculating means for calculating differentiated values with respect to each candidate line, which is among the reference candidate lines and the transformed candidate lines having been set for the reference candidate lines by the transformed candidate line setting means, and calculating a mean value of the differentiated values with respect to each candidate line, the mean value being taken with respect to the direction, along which the candidate line extends,.and the candidate line detecting means may detect, as the predetermined candidate lines, a predetermined number of the candidate lines in the order of decreasing mean value of differentiated values, in lieu of the reference candidate lines defined by Formula (2).

In the modification described above, as another alternative, the evaluation means may comprise:

a) a transformed candidate line setting means for shifting and/or rotating each of the reference candidate lines, which are defined by Formula (2), within the range of ±m picture elements and ±α degrees around the reference candidate line, and thereby setting $\{(2m+1)(2\alpha+1)-1\}$ number of transformed candidate lines with respect to each of the reference candidate lines, and b) an evaluation value calculating means for finding directions of image density gradient vectors with respect to each candidate line, which is among the reference candidate lines and the transformed candidate lines having been set for the reference candidate lines by the transformed candidate line setting means, and calculating an entropy of the directions of image density gradient vectors with respect to each candidate line, the entropy being taken with respect to the direction, along which the candidate line extends, and the candidate line detecting means may detect, as the predetermined candidate lines, a predetermined number of the candidate lines in the order of increasing entropy, in lieu of the reference candidate lines defined by Formula (2).

A blackening processing method and apparatus for a radiation image in accordance with the present invention are characterized by carrying out a blackening process on the region outside of the irradiation field, which has been determined by the method or apparatus for recognizing an irradiation field on a radiation image in accordance with the present invention.

Specifically, the present invention further provides a blackening processing method for a radiation image, in which an image signal representing a radiation image is obtained, the radiation image having been recorded by use of a collimation plate and having an irradiation field thereon, and the image signal is processed such that a region outside of the irradiation field may have approximately the highest level of image density or approximately the lowest level of luminance, wherein the improvement comprises applying, as the irradiation field, an irradiation field having been determined by a method of recognizing an irradiation field on a radiation image in accordance with the present invention.

The present invention still further provides a blackening processing apparatus for a radiation image, in which an image signal representing a radiation image is obtained, the radiation image having been recorded by use of a collimation plate and having an irradiation field thereon, and the image signal is processed such that a region outside of the irradiation field may have approximately the highest level of image density or approximately the lowest level of luminance, wherein the improvement comprises applying, as the irradiation field, an irradiation field having been determined by an apparatus for recognizing an irradiation field on a radiation image in accordance with the present invention.

With the method and apparatus for recognizing an irradiation field on a radiation image in accordance with the present invention, the edge candidate points are detected with respect to the radial straight lines, which have been set with respect to the predetermined point lying in the image. Thereafter, the predetermined number of reference candidate lines, which serve as the edge lines, are detected by the utilization of Hough transform with respect to the edge candidate points. It is determined that the region surrounded by the reference candidate lines is the irradiation field.

As described above, with the method and apparatus for recognizing an irradiation field on a radiation image in accordance with the present invention, in the first stage, a plurality of the edge candidate points are detected with respect to the radial straight lines having been set in the image plane. Also, in the second stage, the reference candidate lines, which are the straight line components connecting the plurality of the edge candidate points, are detected by the utilization of Hough transform and in accordance with the plurality of the detected edge candidate points. Therefore, the degree of freedom of the shapes of the irradiation field contours, which can be detected, can be kept higher than with the conventional methods and apparatuses for recognizing an irradiation field, in which an irradiation field contour is detected within a range of shapes having been set previously and in accordance with a plurality of edge candidate points having been detected with the same operation as that in the aforesaid first stage. Accordingly, with the method and apparatus for recognizing an irradiation field on a radiation image in accordance with the present invention, the irradiation field, which markedly conforms to the actual irradiation field contour, can be recognized. Thus the irradiation field can be recognized accurately.

With the blackening processing method and apparatus for a radiation image in accordance with the present invention, the irradiation field contour, which has been detected accurately by the aforesaid method or apparatus for recognizing an irradiation field on a radiation image in accordance with the present invention, is utilized, and the blackening process is carried out with respect to the region outside of the irradiation field. Therefore, the blackening process for the region outside of the irradiation field can be carried out more accurately than with the conventional blackening processing methods and apparatuses.

BRIEF DESCRIPTION OF THE DRAWINGS

FIG. 2A is a schematic view showing a radiation image recording apparatus, in which a collimation plate is utilized, FIG. 2B is a schematic view showing a stimulable phosphor sheet, on which a radiation image has been recorded by use of the irradiation field stop and an irradiation field contour corresponding to an aperture contour of the irradiation field stop has been formed, and which is to be subjected to a process for recognizing the irradiation field carried out by the embodiment of FIG. 1, FIG. 5 is a block diagram showing a second embodiment of the apparatus for recognizing an irradiation field on a radiation image in accordance with the present invention.

DESCRIPTION OF THE PREFERRED EMBODIMENTS

The present invention will hereinbelow be described in further detail with reference to the accompanying drawings.

Figure 1:
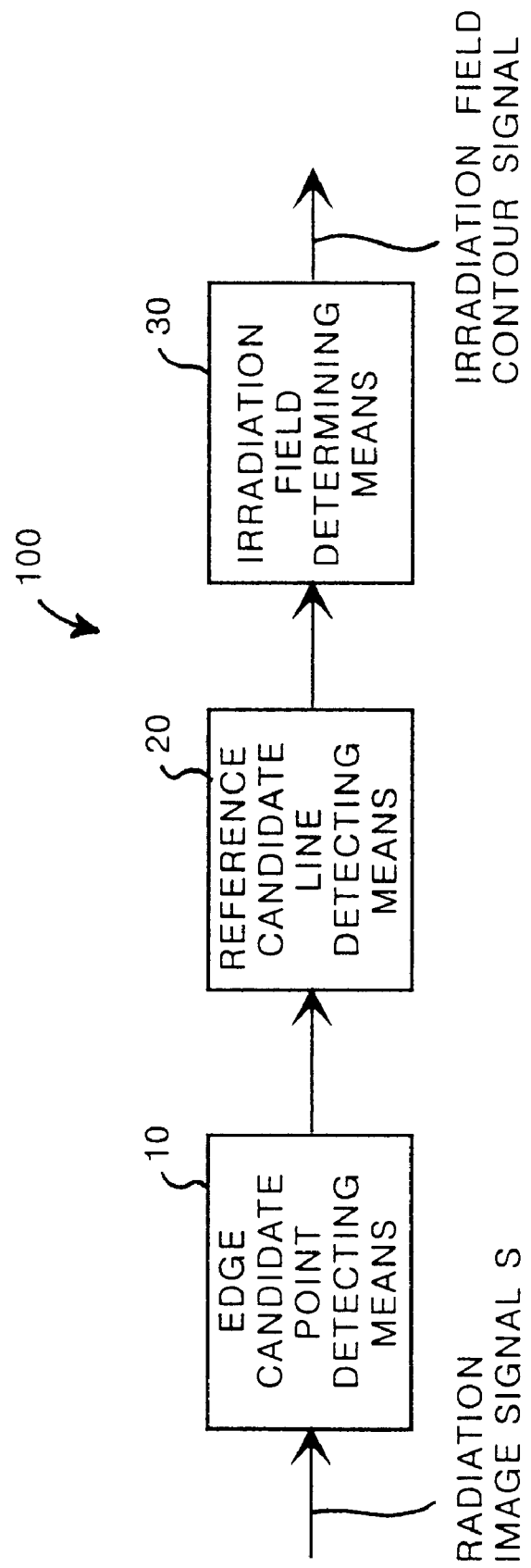
FIG. 1 is a block diagram showing a first embodiment of the apparatus for recognizing an irradiation field on a radiation image in accordance with the present invention.
Figure 3A:
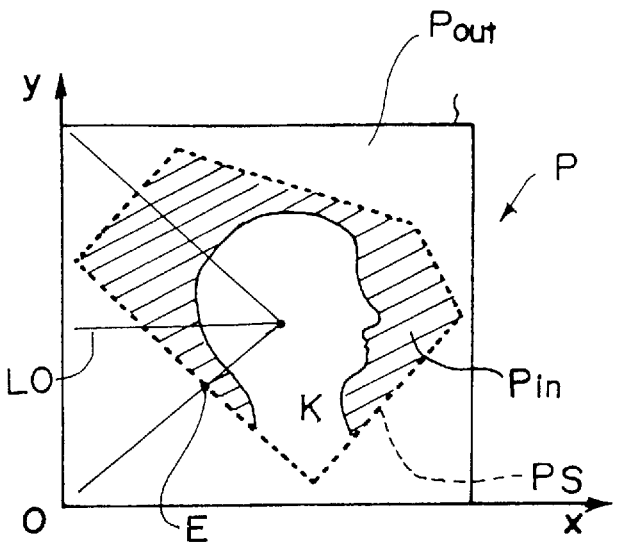
FIG. 3A is an explanatory view showing how edge candidate points are detected by an edge candidate point detecting means 10.
Figure 3B:
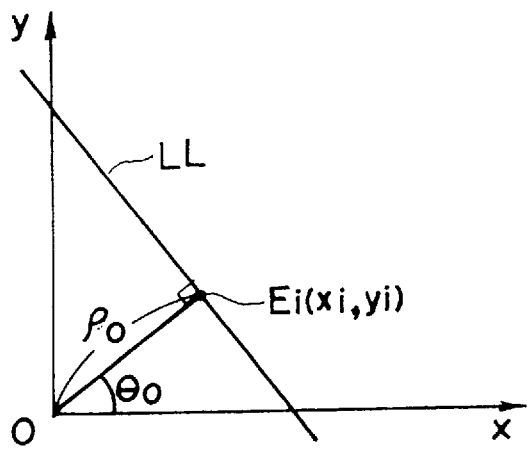
FIGS. 3B and 3C are explanatory graphs showing how reference candidate lines are detected by a reference candidate line detecting means 20.
Figure 3C:
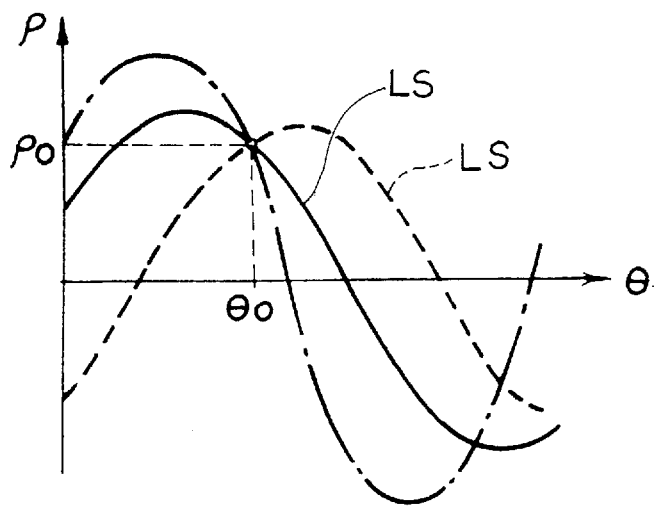

FIG. 1 shows a first embodiment of the apparatus for recognizing an irradiation field on a radiation image in accordance with the present invention. FIG. 2A shows a radiation image recording apparatus, in which a collimation plate is utilized. FIG. 2B shows a stimulable phosphor sheet, on which a radiation image has been recorded by use of the irradiation field stop and an irradiation field contour corresponding to an aperture contour of the irradiation field stop has been formed, and which is to be subjected to a process for recognizing the irradiation field carried out by the embodiment of FIG. 1. FIG. 3A shows how edge candidate points are detected by an edge candidate point detecting means 10. FIGS. 3B and 3C show how reference candidate lines are detected by a reference candidate line detecting means 20.

A radiation image, which is to be subjected to processing carried out by an irradiation field recognizing apparatus 100 shown in FIG. 1, may be obtained in the manner described below. Specifically, as illustrated in FIG. 2A, a collimation plate is located between an X-ray source and an object. The irradiation field stop has a rectangular aperture contour, and its portion outward from the aperture is constituted of a lead plate, which blocks X-rays from impinging upon portions of the object and portions of a stimulable phosphor sheet. In this condition, X-rays are produced by the X-ray source and irradiated to the object. The X-rays pass through the object and then impinge upon the stimulable phosphor sheet. At this time, as illustrated in FIG. 2B, the X-rays do not impinge upon a region Pout on the stimulable phosphor sheet (i.e., a region Pout outside of the irradiation field), which region corresponds to the side outward from the aperture contour of the irradiation field stop. An X-ray image of the object is recorded in a region (i.e., the irradiation field) Pin on the stimulable phosphor sheet, which region corresponds to the side inward from the aperture contour of the irradiation field stop. Also, at the portion of the stimulable phosphor sheet, which portion corresponds to the aperture contour of the irradiation field stop, an irradiation field contour PS is formed. The irradiation field contour PS has a (rectangular) shape approximately identical with the shape of the aperture contour of the irradiation field stop and is constituted of a plurality of edge lines, at which the image density changes sharply.

In the manner described above, a radiation image (hereinbelow referred to as the original image) P is stored on the stimulable phosphor sheet. The stimulable phosphor sheet, on which the original image P has been stored, is fed into a radiation image read-out apparatus (not shown), which may be of the known type. In the radiation image read-out apparatus, the original image P is read out from the stimulable phosphor sheet, and a digital image signal S representing the original image P is thereby obtained. The image signal S is fed into the irradiation field recognizing apparatus 100 shown in FIG. 1.

The irradiation field recognizing apparatus 100 comprises an edge candidate point detecting means 10 for detecting a plurality of edge candidate points E, which are considered to constitute the irradiation field contour PS, in accordance with the received image signal S. The irradiation field recognizing apparatus 100 also comprises a reference candidate line detecting means 20 for detecting edge lines (reference candidate lines) LL, which are constituted by the plurality of the edge candidate points E, by the utilization of Hough transform and in accordance with the edge candidate points E. The irradiation field recognizing apparatus 100 further comprises an irradiation field determining means 30 for recognizing the irradiation field in accordance with a plurality of the reference candidate lines, which have been detected by the reference candidate line detecting means 20.

The irradiation field recognizing apparatus 100 will hereinbelow be described in more detail.

As illustrated in FIG. 3A, the edge candidate point detecting means 10 sets 120 radial straight lines LO at equal angle intervals (=3 degrees), which lines extend from a center point K in the image P represented by the received image signal S toward ends of the radiation image. The number of the radial straight lines, the intervals of them, the point, from which they extend, and the like, may be altered arbitrarily.

Thereafter, the edge candidate point detecting means 10 compares the image signal values corresponding to picture elements, which are adjacent to each other in the direction along each of the 120 radial straight lines LO. The edge candidate point detecting means 10 thereby finds a set of the picture elements, which show the largest value of difference in image signal value, on each of the radial straight lines LO. It may be considered that an edge candidate point corresponding to an edge in the image, at which the image density changes sharply, is located between the thus found set of the picture elements. In this manner, the edge candidate point E is detected with respect to each of the 120 radial straight lines LO, and 120 total of the edge candidate points E are thereby detected.

The reference candidate line detecting means 20 detects a sine curve LS, which may be represented by Formula (1) shown below, with respect to each of the edge candidate points E, which have been detected by the edge candidate point detecting means 10.

$$\rho = xi \cos \theta + yi \sin \theta \quad (1)$$

wherein the coordinates of each of the edge candidate points E on the x-y coordinate system shown in FIG. 3A are represented by (xi, yi), and xi and yi are taken as fixed values.

As illustrated in FIG. 3B, Formula (1) represents the formula of straight lines, which pass through the coordinates (xi, yi), the center coordinates being fixed at (xi, yi). Also, in Formula (1), $\rho$ represents the length of the perpendicular dropped from the origin O of the x-y coordinate system to each straight line LL, which passes through the coordinates (xi, yi), and $\theta$ represents the angle made between the perpendicular and the x axis.

The straight lines LL, which pass through the coordinates (xi, yi), are represented by Formula (1), in which $\rho$ and $\theta$ are changed. As illustrated in FIG. 3C, in the $\theta$-$\rho$ space (i.e. the Hough space), the straight lines LL, which pass through the coordinates (xi, yi), are expressed as the sine curve.

The same operation as that described above is carried out with respect to each of the edge candidate points. As a result, 120 sine curves LSi, wherein i=1, 2, ..., 120, are expressed in the Hough space.

The reference candidate line detecting means 20 detects points of intersection ($\rho$j, $\theta$j), at which 120 sine curves LSi intersect with one another, and counts the number of the sine curves, which intersect with one another at each of the points of intersection ($\rho$j, $\theta$j), with respect to each of the points of intersection ($\rho$j, $\theta$j). In cases where two sine curves intersect with each other at a certain point of intersection ($\rho$j, $\theta$j), it is meant that the two sine curves pass through the coordinates ($\rho$j, $\theta$j). This means that two different edge candidate points E1 and E2 lie on the same straight line, which is represented by Formula (2) shown below and passes through the coordinates (x, y) on the x-y coordinate system that correspond to the coordinates ($\rho$j, ($\theta$j).

$$\rho j = x \cos \theta j + y \sin \theta j \quad (2)$$

Therefore, a straight line corresponding to a point of intersection, at which the number (the count value) of the sine curves intersecting with one another is large, is the one, on which many edge candidate points E lie and which constitutes the irradiation field contour PS.

The reference candidate line detecting means 20 carries out the aforesaid counting operation with respect to all of the edge candidate points E, and extracts a predetermined number of the points of intersection ($\rho$j, $\theta$j) in the order of decreasing count value. Also, the reference candidate line detecting means 20 detects a straight line on the x-y coordinate system, which line corresponds to each of the extracted points of intersection ($\rho$j, $\theta$j). The predetermined number of the straight lines, which correspond to the extracted points of intersection ($\rho$j, $\theta$j), are thereby detected. The predetermined number of the straight lines having thus been detected are the reference candidate lines LL.

The irradiation field determining means 30 determines the irradiation field contour PS in accordance with the plurality of the reference candidate lines LL, which have been detected in the manner described above. The irradiation field determining means 30 feeds the image signal, which corresponds to the irradiation field contour PS, into an external image processing apparatus, or the like.

How the irradiation field recognizing apparatus 100 of FIG. 1 operates will be described hereinbelow.

The image signal S representing the image P, on which the irradiation field contour PS has been formed, is fed into the irradiation field recognizing apparatus 100. Firstly, the edge candidate point detecting means 10 sets the center point K with respect to the received image signal S, and sets 120 radial straight lines LO at equal angle intervals, which lines start with the center point K.

Thereafter, with respect to each of the radial straight lines, the edge candidate point detecting means 10 compares the image signal values corresponding to picture elements, which are adjacent to each other in the direction along the radial straight line. The edge candidate point detecting means 10 thereby finds an edge candidate point E, at which the difference in image signal value is largest. After the edge candidate points E have thus been detected with respect to all of the radial straight lines, the information representing the coordinates of the position of each of the edge candidate points E is fed into the reference candidate line detecting means 20. At this time, the coordinates are set with respect to the x-y coordinate system in the plane of the radiation image.

Figure 4A:
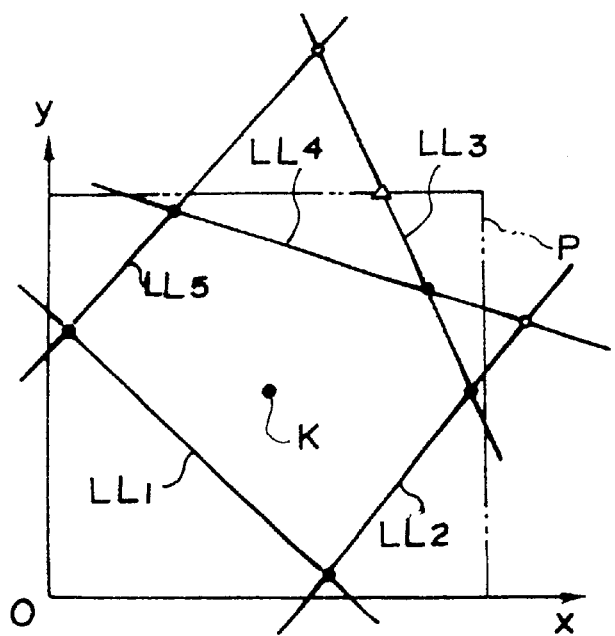
FIG. 4A is a graph showing reference candidate lines LL, which have been detected by the reference candidate line detecting means 20.

In accordance with the received information representing the 120 edge candidate points E, the reference candidate line detecting means 20 detects a predetermined number of the reference candidate lines LL, which number has been set in the reference candidate line detecting means 20. FIG. 4A shows the cases wherein the predetermined number of the reference candidate lines LL is five. The thus detected reference candidate lines LL (LL1, LL2, LL3, LL4, and LL5) are the straight lines, portions of which can constitute the sides of the irradiation field contour PS.

Figure 4B:
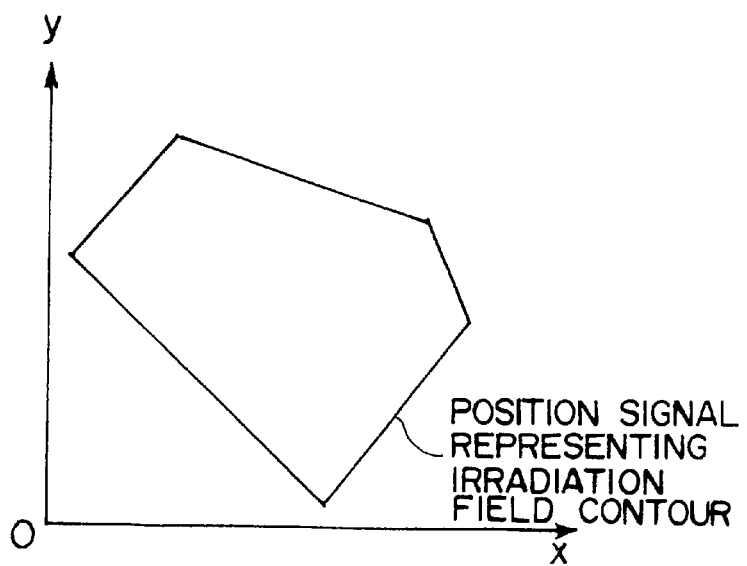
FIG. 4B is a graph showing an irradiation field contour PS, which has been determined by an irradiation field determining means 30.

The information representing the plurality of the reference candidate lines LL having thus been detected is fed into the irradiation field determining means 30. The irradiation field determining means 30 determines that the Ad region surrounded by the plurality of the reference candidate lines LL is the irradiation field Pin. Also, the irradiation field determining means 30 determines that the contour of the irradiation field Pin is the irradiation field contour PS. The irradiation field determining means 30 feeds a position signal, which represents the picture elements constituting the irradiation field contour PS as shown in FIG. 4B, into the external image processing apparatus, or the like.

The external image processing apparatus carries out a blackening process, or the like, on the radiation image signal S, which has been received via a different signal transmission line, in accordance with the position signal, which represents the picture elements constituting the irradiation field contour PS. With the blackening process, the image signal values corresponding to the region Pout outside of the irradiation field, which region is located more outward than the irradiation field contour PS, are uniformly replaced by image signal values representing the highest image density. The thus obtained image, in which the region Pout outside of the irradiation field has been blackened, is used for making a diagnosis, or the like.

As described above, with this embodiment of the apparatus for recognizing an irradiation field on a radiation image in accordance with the present invention, the edge candidate points are detected with respect to the radial straight lines, which have been set with respect to the predetermined point lying in the image. Thereafter, the predetermined number of the reference candidate lines are detected by the utilization of Hough transform with respect to the edge candidate points. It is determined that the region surrounded by the reference candidate lines is the irradiation field. Therefore, the accuracy, with which the irradiation field contour is recognized, can be kept higher than with the conventional methods or apparatuses for recognizing an irradiation field.

A second embodiment of the apparatus for recognizing an irradiation field on a radiation image in accordance with the present invention will be described hereinbelow with reference to FIG. 5.

In the irradiation field recognizing apparatus shown in FIG. 5, the irradiation field recognizing apparatus 100 of FIG. 1 is modified such that it may further comprise an evaluation means 40 and a candidate line detecting means 50, and such that the irradiation field determining means 30 may be replaced by an irradiation field determining means 30'. In the second embodiment, the reference candidate line detecting means 20 detects a larger number of reference candidate lines than in the first embodiment of FIG. 1. The evaluation means 40 makes evaluation, which utilizes a predetermined evaluation function, with respect to each of the thus detected reference candidate lines. The candidate line detecting means 50 detects predetermined candidate lines LL', which are considered to more accurately constitute the irradiation field contour, in accordance with the results of the evaluation having been made by the evaluation means 40. The predetermined candidate lines LL' are detected from the reference candidate lines or in lieu of the reference candidate lines. Also, in lieu of the region surrounded by the reference candidate lines LL being determined as the irradiation field, the irradiation field determining means 30' determines that a region surrounded by the predetermined candidate lines LL', which have been detected by the candidate line detecting means 50, is the irradiation field.

With the second embodiment of the irradiation field recognizing apparatus, the predetermined candidate lines, which have a higher eligibility for the irradiation field contour than in the first embodiment of FIG. 1, can be detected. Therefore, the accuracy, with which the irradiation field contour is recognized, can be kept higher than in the first embodiment of FIG. 1.

Figure 6:
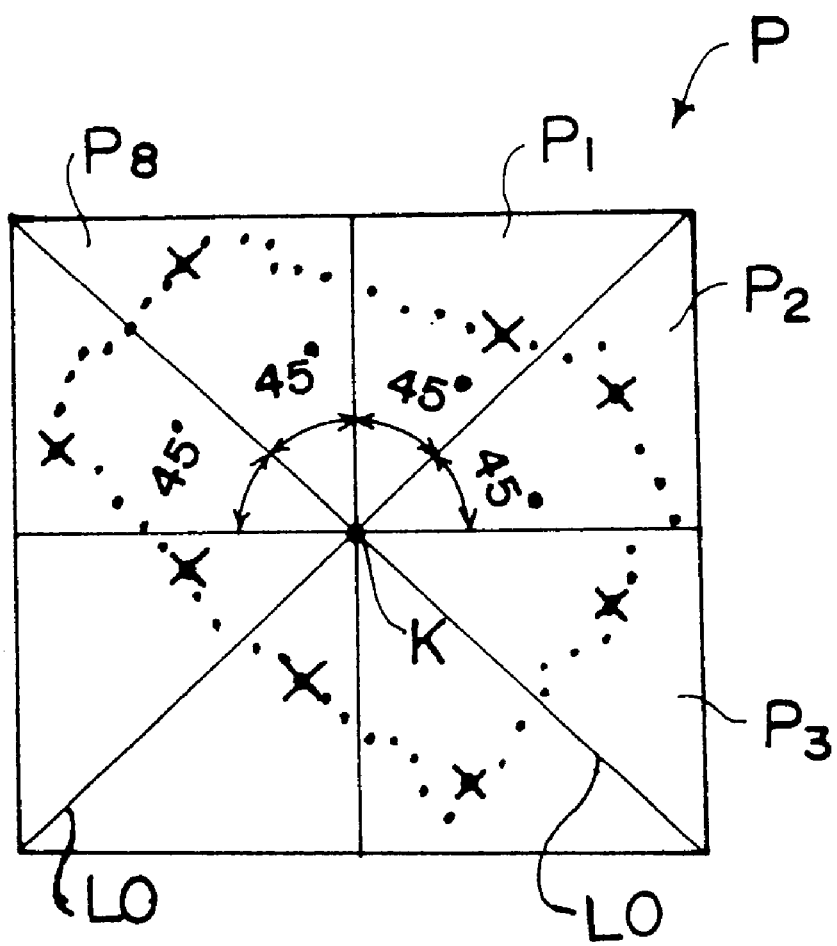
FIG. 6 is an explanatory view showing representative points, which are utilized in the embodiment of FIG. 5.

By way of example, the evaluation means 40 may operate in the manner described below. Specifically, as illustrated in FIG. 6, the evaluation means 40 divides the radiation image into eight regions P1, P2, . . . , P8 at angle intervals of 45 degrees around a predetermined point, such as the center point, in the image. (In cases where a specific point is set by the edge candidate point detecting means 10, the set specific point may be employed as the predetermined point.) In FIG. 6, the dots represent the edge candidate points, which have been set by the edge candidate point detecting means 10. The evaluation means 40 finds an edge candidate point indicated by the mark "x", which is associated with the largest value of difference in image signal value among the 15 edge candidate points contained in each of the divided regions. The evaluation means 40 sets the thus found edge candidate points, which are indicated by the mark "x", as the representative points. Thereafter, with respect to each of the reference candidate lines, the evaluation means 40 makes a judgment as to whether the representative points lie or does not lie on the reference candidate line.

In such cases, the candidate line detecting means 50 detects, as the predetermined candidate lines, the reference candidate lines, which are among the aforesaid reference candidate lines and for which it has been judged that the corresponding representative points lie thereon.

In the manner described above, the representative points are set by the evaluation means 40. Alternatively, the representative points may be set previously by a different means, or the like.

Figure 7:
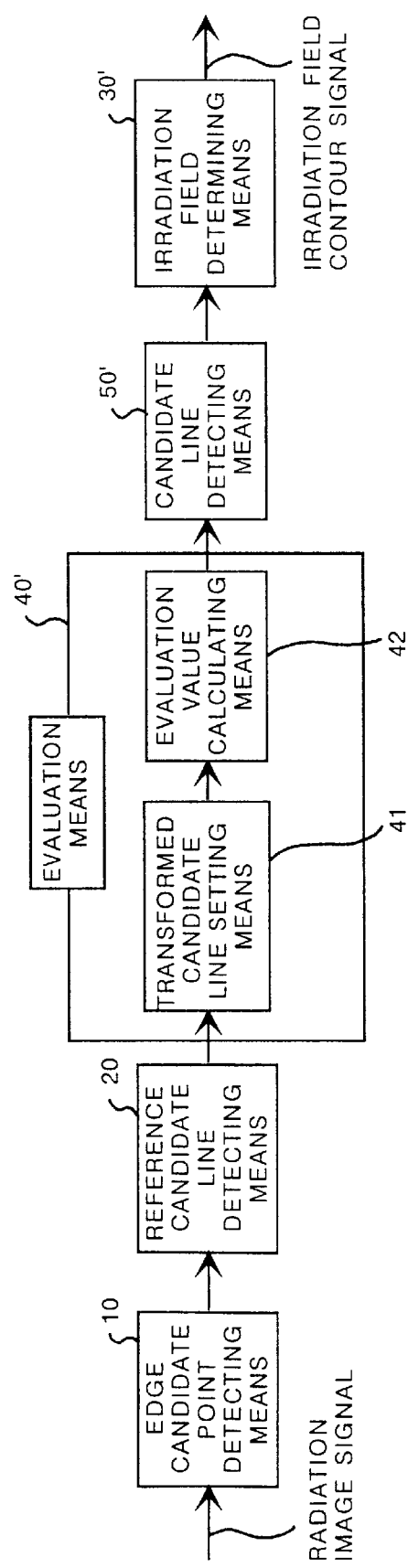
FIG. 7 is a block diagram showing a third embodiment of the apparatus for recognizing an irradiation field on a radiation image in accordance with the present invention.

FIG. 7 shows a third embodiment of the apparatus for recognizing an irradiation field on a radiation image in accordance with the present invention. In the third embodiment, a different evaluation means 40' and a different candidate line detecting means 50' are employed.

Figure 8:
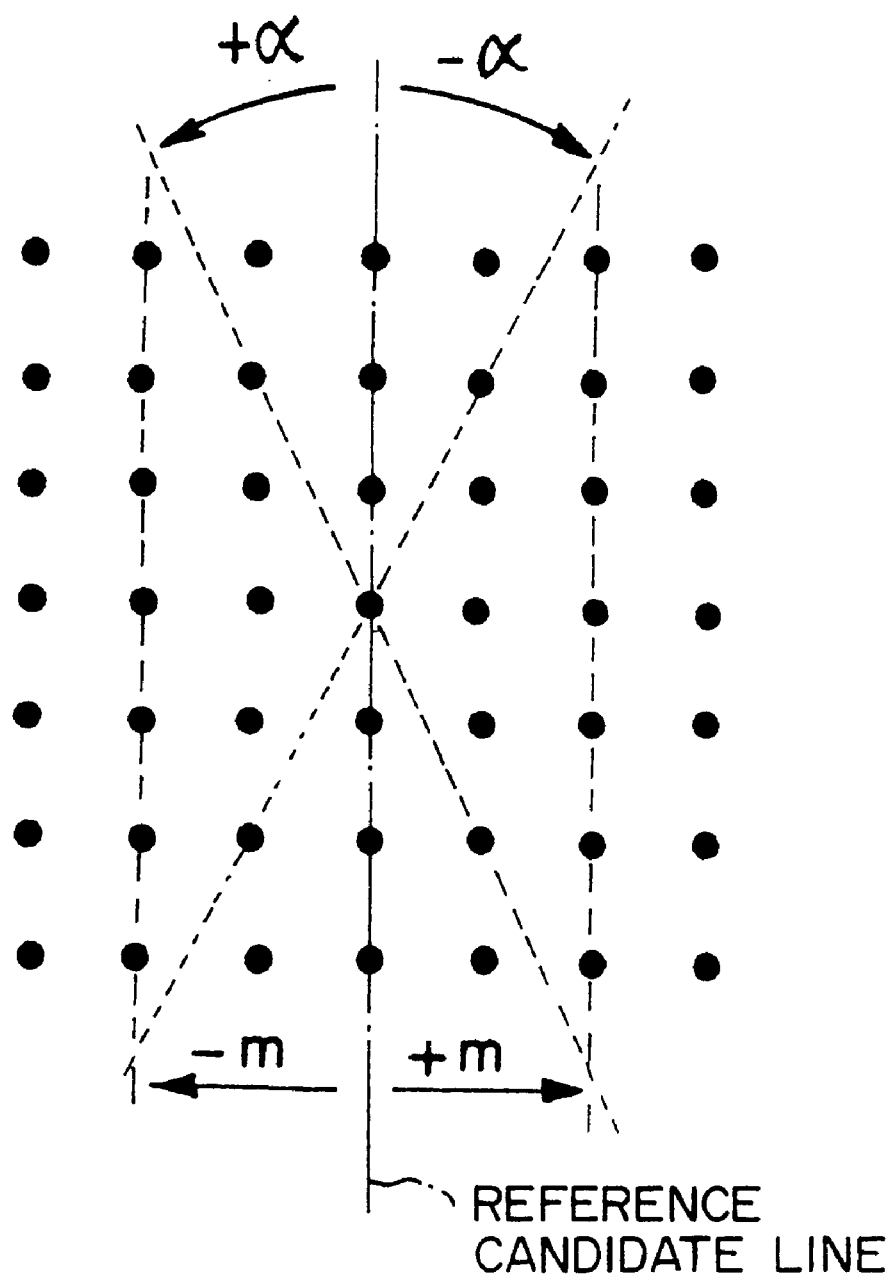
FIG. 8 is an explanatory view showing how a plurality of candidate lines are set.

Specifically, in the third embodiment of the irradiation field recognizing apparatus, the evaluation means 40' comprises a transformed candidate line setting means 41 and an evaluation value calculating means 42. As illustrated in FIG. 8, the transformed candidate line setting means 41 shifts and/or rotates each of the reference candidate lines, which have been detected by the reference candidate line detecting means 20, within the range of ±m picture elements and ±α degrees around the reference candidate line. The transformed candidate line setting means 41 thereby sets {(2m+1)(2α+1)−1} number of transformed candidate lines with respect to each of the reference candidate lines. With respect to each candidate line, which is among the original reference candidate lines and the transformed candidate lines having been set for the reference candidate lines, the evaluation value calculating means 42 carries out operations with a function (1) or a function (2) described below.

Figure 9A:
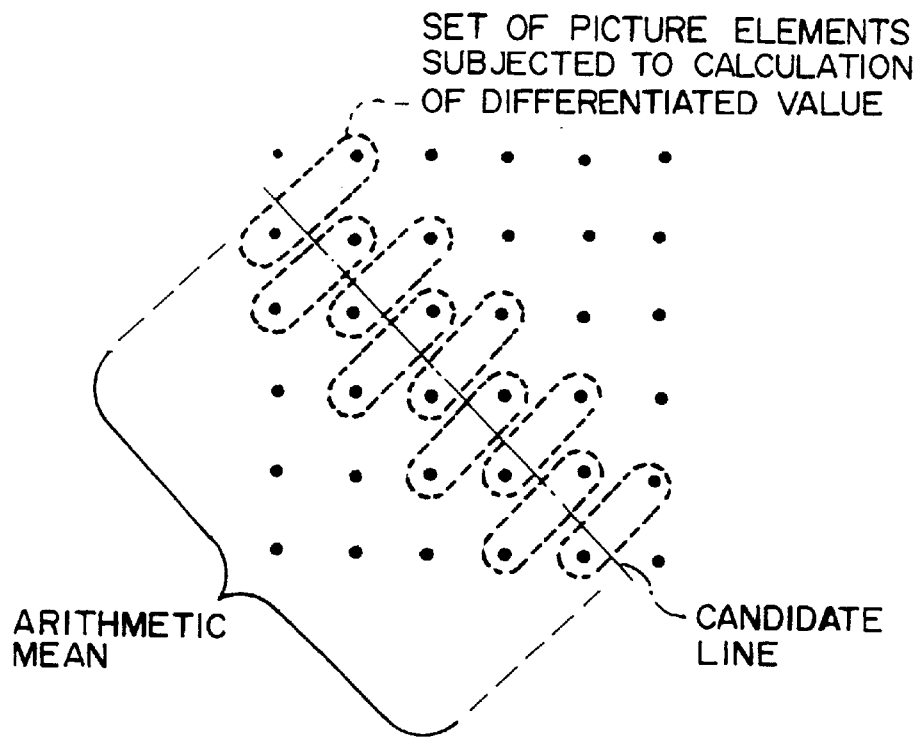
FIG. 9A is an explanatory view showing how a mean value of differentiated values with respect to each candidate line is calculated as an evaluation value.

(1) A function for, as illustrated in FIG. 9A, calculating differentiated values with respect to each candidate line (i.e., each of the reference candidate lines and the transformed candidate lines), and calculating a mean value of the differentiated values with respect to each candidate line, the mean value being taken with respect to the direction, along which the candidate line extends.

Figure 9B:
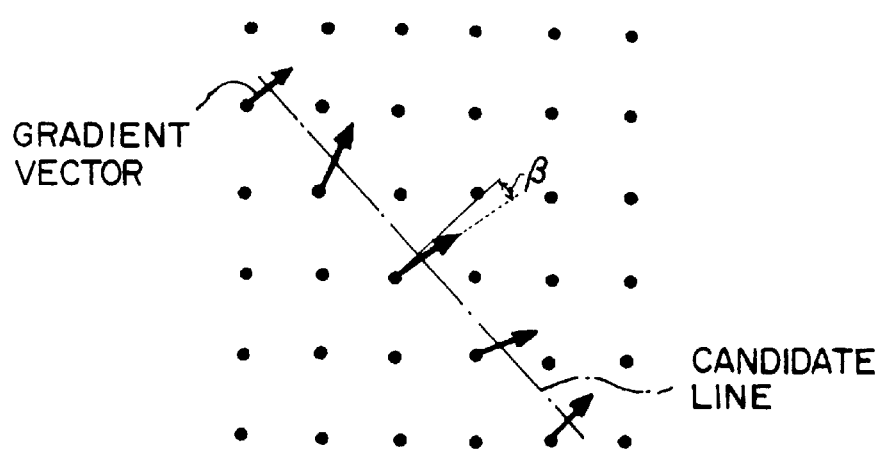
FIG. 9B is an explanatory view showing how an entropy of directions of image density gradient vectors with respect to each candidate line is calculated as an evaluation value.

(2) A function for, as illustrated in FIG. 9B, finding directions of image density gradient vectors with respect to each candidate line (i.e., each of the reference candidate lines and the transformed candidate lines), and calculating an entropy of the directions of image density gradient vectors with respect to each candidate line, the entropy being taken with respect to the direction, along which the candidate line extends.

Also, in cases where the former evaluation function (1) is employed, a candidate line detecting means 50' detects, as the predetermined candidate lines, a predetermined number of the candidate lines in the order of decreasing mean value of differentiated values. In cases where the latter evaluation function (2) is employed, the candidate line detecting means 50' detects, as the predetermined candidate lines, a predetermined number of the candidate lines in the order of increasing entropy.

The differentiated value with respect to each candidate line in the former evaluation function (1) is the value of difference between the image signal components representing two picture elements, which stand facing each other with the candidate line intervening therebetween. A large difference value represents that the difference in image density between the two picture elements is large, and that an edge in the image lies between the two picture elements. As illustrated in FIG. 9A, a plurality of sets of the two picture elements, which stand facing each other with the candidate line intervening therebetween, are located in the direction, along which the candidate line extends. (Each set of the two picture elements is surrounded by the broken line in FIG. 9A). Therefore, a plurality of differentiated values are obtained with respect to the plurality of the sets of the two picture elements, the sets being located in the direction, along which the candidate line extends. The differentiated values having been obtained with respect to the sets of the two picture elements, the sets being located in the direction, along which the candidate line extends, are added to one another, and the thus calculated sum is divided by the number of the sets of the two picture elements. In this manner, the mean value described above is calculated. A large mean value represents a strong probability that the candidate line will be the actual edge in the radiation image.

Accordingly, the predetermined number of the candidate lines, which have been detected as the predetermined candidate lines by the candidate line detecting means 50' in the order of decreasing mean value of differentiated values having been obtained from the evaluation value calculating means 42, have a higher eligibility for the irradiation field contour than in the first embodiment of FIG. 1. Therefore, the accuracy, with which the irradiation field contour is recognized, can be kept higher than in the first embodiment of FIG. 1.

The image density gradient vector with respect to each candidate line in the latter evaluation function (2) is the vector directed from each of picture elements, which are located on one side of the candidate line, toward the direction, in which the gradient of the image density (i.e., the value of difference in image signal value) is largest. An index value representing the direction, to which the image density gradient vector is directed, is calculated. As the index value, for example, the sine value (sin β) of an angle β, which is made between the direction of the image density gradient vector and the direction that is normal to the candidate line, may be employed. As illustrated in FIG. 9B, with respect to the directions of image density gradient vectors from the picture elements located in the direction, along which the candidate line extends, a histogram of the index values is formed. Thereafter, the entropy, $-\Sigma\{(Pi)\log Pi\}$, is calculated from a probability density Pi of the histogram. A small entropy represents that the directions of image density gradient vectors are directed in the same direction. Therefore, there is a strong probability that the candidate line, which is associated with a small entropy, will be the actual edge in the radiation image.

Accordingly, the predetermined number of the candidate lines, which have been detected as the predetermined candidate lines by the candidate line detecting means 50' in the order of increasing entropy having been obtained from the evaluation value calculating means 42, have a higher eligibility for the irradiation field contour than in the first embodiment of FIG. 1. Therefore, the accuracy, with which the irradiation field contour is recognized, can be kept higher than in the first embodiment of FIG. 1.

The method and apparatus for recognizing an irradiation field on a radiation image in accordance with the present invention is not limited to the embodiment described above and may be embodied in various other ways. Also, the evaluation means is not limited to the evaluation means 40 or 40' described above and may be constituted as one of various other kinds of means.

Further, the image signal given to the method and apparatus for recognizing an irradiation field on a radiation image in accordance with the present invention is not limited to the original image signal S and may be a reduced image signal S' representing an image, which has already been reduced for obtaining desired characteristics. (For example, the image signal may be the one having been detected with a preliminary read-out operation for reading out a radiation image with respect to picture elements larger than those of a final read-out operation before the final read-out operation is carried out. The preliminary read-out operation is carried out in order for a dynamic range of the radiation image, which has been stored on a stimulable phosphor sheet, or the like, to be ascertained approximately.)

An embodiment of the blackening processing apparatus for a radiation image in accordance with the present invention will be described hereinbelow with reference to FIG. 10.

Figure 10:
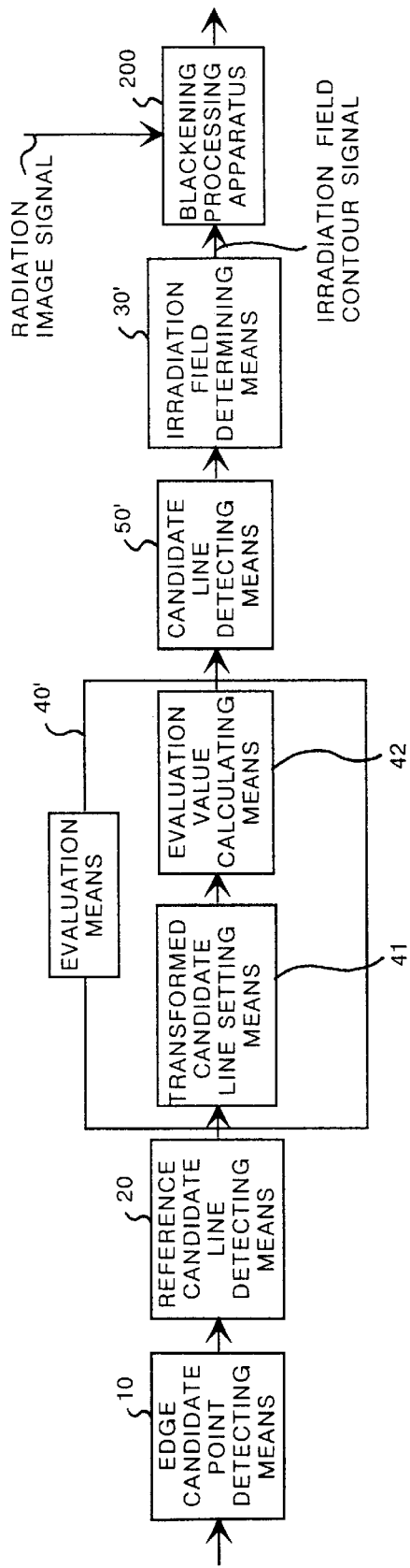
FIG. 10 is a block diagram showing an embodiment of the blackening processing apparatus for a radiation image in accordance with the present invention.

With reference to FIG. 10, a blackening processing apparatus 200 carries out a blackening process, or the like, on the radiation image signal S, which has been received via a different signal transmission line, in accordance with the position signal, which represents the picture elements constituting the irradiation field contour PS as shown in FIG. 4B and has been received from the irradiation field recognizing apparatus illustrated in FIG. 7. With the blackening process, the image signal values corresponding to the region Pout outside of the irradiation field, which region is located more outward than the irradiation field contour PS, are uniformly replaced by image signal values representing the highest image density.

With the blackening processing apparatus 200, the blackening process is carried out in accordance with the irradiation field contour, which has been detected more accurately than with the conventional methods or apparatuses for recognizing an irradiation field. Therefore, the blackening process for the region outside of the irradiation field can be carried out more accurately than with the conventional blackening processing methods and apparatuses.

The blackening processing apparatus for a radiation image in accordance with the present invention is not limited to the embodiment shown in FIG. 10 and may be embodied in various other ways, in which the blackening process is carried out in accordance with the irradiation field contour having been obtained from the embodiment of the irradiation field recognizing apparatus in accordance with the present invention shown in FIG. 1 or 5 or a different embodiment of the irradiation field recognizing apparatus in accordance with the present invention.

What is claimed is:

1. A method of recognizing an irradiation field on a radiation image, in which an image signal representing a radiation image is obtained, the radiation image having been recorded by use of a collimation plate and having an irradiation field thereon, and a process for recognizing the irradiation field is carried out, the irradiation field being recognized in accordance with the image signal, the method comprising the steps of:
   i) setting a plurality of radial straight lines extending from a predetermined point, which lies within the irradiation field, toward ends of the radiation image,
   ii) detecting an edge candidate point with respect to each of said set radial straight lines and in accordance with values of the image signal, which correspond to positions located along the radial straight line, said edge candidate point being considered to constitute a contour of the irradiation field on the radial straight line, a plurality of edge candidate points being thereby detected with respect to the plurality of said radial straight lines,
   iii) detecting a curved line, which may be represented by Formula (1), with respect to each of said edge candidate points:

$$\rho = xi \cos \theta + yi \sin \theta \qquad (1)$$

wherein coordinates of each of said edge candidate points on an orthogonal coordinate system having been set in the plane of the radiation image are represented by (xi, yi), and xi and yi are taken as fixed values, a plurality of curved lines being thereby found with respect to the plurality of said edge candidate points, iv) detecting points of intersection (ρj, θj), at which the detected curved lines intersect with one another, the number of the curved lines, which intersect with one another at each of said points of intersection (ρj θj), being then counted with respect to each of said points of intersection (ρj, θj), v) extracting a predetermined number of the points of intersection (ρj, θj) in the order of decreasing count value, vi) detecting a reference candidate line on said orthogonal coordinate system, said reference candidate line corresponding to each of said extracted points of intersection (ρj, θj) and being defined by Formula (2):

$$\rho j = xi \cos \theta j + yi \sin \theta j \tag{2}$$

a plurality of the reference candidate lines, which correspond to said extracted points of intersection (ρj, θj) being thereby detected, and vii) determining that a region surrounded by the plurality of said reference candidate lines defined by Formula (2) is the irradiation field;

vii) evaluating, utilizing a predetermined evaluation function is made with respect to each of said reference candidate lines defined by Formula (2), predetermined candidate lines are detected in accordance with the results of said evaluation, said predetermined candidate lines being detected from said reference candidate lines or in lieu of said reference candidate lines, and it is further determined that a region surrounded by said predetermined candidate lines, in lieu of said reference candidate lines, is the irradiation field; and wherein the evaluation utilizing said predetermined evaluation function is made by making a judgment for each of said reference candidate lines defined by Formula (2) as to whether a predetermined representative point, which has been set previously as a point lying on said irradiation field contour, lies or does not lie on the reference candidate line, and said predetermined candidate lines are the reference candidate lines, which are among said reference candidate lines defined by Formula (2) and for which it has been judged that the corresponding predetermined representative points lie thereon.

2. A method of recognizing an irradiation field on a radiation image, in which an image signal representing a radiation image is obtained, the radiation image having been recorded by use of a collimation plate and having an irradiation field thereon, and a process for recognizing the irradiation field is carried out, the irradiation field being recognized in accordance with the image signal, the method comprising the steps of:

i) setting a plurality of radial straight lines extending from a predetermined point, which lies within the irradiation field, toward ends of the radiation image, ii) detecting an edge candidate point with respect to each of said set radial straight lines and in accordance with values of the image signal, which correspond to positions located along the radial straight line, said edge candidate point being considered to constitute a contour of the irradiation field on the radial straight line, a plurality of edge candidate points being thereby detected with respect to the plurality of said radial straight lines, iii) detecting a curved line, which may be represented by Formula (1), with respect to each of said edge candidate points:

$$\rho = xi \cos \theta + yi \sin \theta \tag{1}$$

wherein coordinates of each of said edge candidate points on an orthogonal coordinate system having been set in the plane of the radiation image are represented by (xi, yi), and xi and yi are taken as fixed values, a plurality of curved lines being thereby found with respect to the plurality of said edge candidate points, iv) detecting points of intersection (ρj, θj), at which the detected curved lines intersect with one another, the number of the curved lines, which intersect with one another at each of said points of intersection (ρj, θj), being then counted with respect to each of said points of intersection (ρj, θj), v) extracting a predetermined number of the points of intersection (ρj, θj) in the order of decreasing count value, vi) detecting a reference candidate line on said orthogonal coordinate system, said reference candidate line corresponding to each of said extracted points of intersection (ρj, θj) and being defined by Formula (2):

$$\rho j = xi \cos \theta j + yi \sin \theta j \tag{2}$$

a plurality of the reference candidate lines, which correspond to said extracted points of intersection (ρj, θj) being thereby detected, and vii) determining that a region surrounded by the plurality of said reference candidate lines defined by Formula (2) is the irradiation field; and viii) evaluating, utilizing a predetermined evaluation function with respect to each of said reference candidate lines defined by Formula (2), wherein the predetermined candidate lines are detected in accordance with the results of said evaluation, said predetermined candidate lines being detected from said reference candidate lines or in lieu of said reference candidate lines, it is determined that a region surrounded by said predetermined candidate lines, in lieu of said reference candidate lines, is the irradiation field; and wherein the evaluation utilizing said predetermined evaluation function is made by shifting and/or rotating each of said reference candidate lines, which are defined by Formula (2), thereby setting a plurality of transformed candidate lines with respect to each of said reference candidate lines, calculating differentiated values with respect to each candidate line, which is among said reference candidate lines and said transformed candidate lines having been set for said reference candidate lines, and calculating a mean value of said differentiated values with respect to each candidate line, said mean value being taken with respect to the direction, along which the candidate line extends, and said predetermined candidate lines are a predetermined total number of the reference candidate lines and the transformed candidate lines, which have been selected in the order of decreasing mean value of differentiated values, in lieu of said reference candidate lines defined by Formula (2).

3. The method of recognizing an irradiation field on a radiation image as defined in claim 2, wherein said shifting and/or rotating each of said reference candidate lines, is within the range of ±m picture elements and ±α degrees around the reference candidate line, and $\{(2m+1)(2\alpha+1)-1\}$ transformed candidate lines are set with respect to each of said reference candidate lines.

4. A method of recognizing an irradiation field on a radiation image, in which an image signal representing a radiation image is obtained, the radiation image having been recorded by use of a collimation plate and having an irradiation field thereon, and a process for recognizing the irradiation field is carried out, the irradiation field being recognized in accordance with the image signal, the method comprising the steps of:

i) setting a plurality of radial straight lines extending from a predetermined point, which lies within the irradiation field, toward ends of the radiation image, ii) detecting an edge candidate point with respect to each of said set radial straight lines and in accordance with values of the image signal, which correspond to positions located along the radial straight line, said edge candidate point being considered to constitute a contour of the irradiation field on the radial straight line, a plurality of edge candidate points being thereby detected with respect to the plurality of said radial straight lines, iii) detecting a curved line, which may be represented by Formula (1), with respect to each of said edge candidate points:

$$\rho = xi \cos \theta + yi \sin \theta \tag{1}$$

wherein coordinates of each of said edge candidate points on an orthogonal coordinate system having been set in the plane of the radiation image are represented by (xi, yi), and xi and yi are taken as fixed values, a plurality of curved lines being thereby found with respect to the plurality of said edge candidate points, iv) detecting points of intersection (ρj, θj), at which the detected curved lines intersect with one another, the number of the curved lines, which intersect with one another at each of said points of intersection (ρj, θj), being then counted with respect to each of said points of intersection (ρj, θj), v) extracting a predetermined number of the points of intersection (ρj, θj) in the order of decreasing count value, vi) detecting a reference candidate line on said orthogonal coordinate system, said reference candidate line corresponding to each of said extracted points of intersection (ρj, θj) and being defined by Formula (2):

$$\rho j = xi \cos \theta j + yi \sin \theta j \tag{2}$$

a plurality of the reference candidate lines, which correspond to said extracted points of intersection (ρj, θj) being thereby detected, and vii) determining that a region surrounded by the plurality of said reference candidate lines defined by Formula (2) is the irradiation field;

viii) evaluating, utilizing a predetermined evaluation function with respect to each of said reference candidate lines defined by Formula (2), wherein predetermined candidate lines are detected in accordance with the results of said evaluation, said predetermined candidate lines being detected from said reference candidate lines or in lieu of said reference candidate lines, and it is determined that a region surrounded by said predetermined candidate lines, in lieu of said reference candidate lines, is the irradiation field; and wherein the evaluation utilizing said predetermined evaluation function is made by shifting and/or rotating each of said reference candidate lines, which are defined by Formula (2), thereby setting a plurality of transformed candidate lines with respect to each of said reference candidate lines, finding directions of image density gradient vectors with respect to each candidate line, which is among said reference candidate lines and said transformed candidate lines having been set for said reference candidate lines, and calculating an entropy of said directions of image density gradient vectors with respect to each candidate line, said entropy being taken with respect to the direction, along which the candidate line extends, and said predetermined candidate lines are a predetermined total number of the reference candidate lines and the transformed candidate lines, which have been selected in the order of increasing entropy, in lieu of said reference candidate lines defined by Formula (2).

5. The method of recognizing an irradiation field on a radiation image as defined in claim 4, wherein said shifting and/or rotating each of said reference candidate lines, is within the range of ±m picture elements and ±α degrees around the reference candidate line, and $\{(2m+1)(2\alpha+1)-1\}$ transformed candidate lines are set with respect to each of said reference candidate lines.

6. An apparatus for recognizing an irradiation field on a radiation image, in which an image signal representing a radiation image is obtained, the radiation image having been recorded by use of a collimation plate and having an irradiation field thereon, and a process for recognizing the irradiation field is carried out, the irradiation field being recognized in accordance with the image signal, the apparatus comprising:

i) an edge candidate point detecting means for setting a plurality of radial straight lines extending from a predetermined point, which lies within the irradiation field, toward ends of the radiation image, and detecting an edge candidate point with respect to each of said set radial straight lines and in accordance with values of the image signal, which correspond to positions located along the radial straight line, said edge candidate point being considered to constitute a contour of the irradiation field on the radial straight line, a plurality of edge candidate points being thereby detected with respect to the plurality of said radial straight lines, ii) a reference candidate line detecting means for:

detecting a curved line, which may be represented by Formula (1), with respect to each of said edge candidate points having been detected by said edge candidate point detecting means:

$$\rho = xi \cos \theta + yi \sin \theta \tag{1}$$

wherein coordinates of each of said edge candidate points on an orthogonal coordinate system having been set in the plane of the radiation image are represented by (xi, yi), and xi and yi are taken as fixed values, a plurality of curved lines being thereby found with respect to the plurality of said edge candidate points, detecting points of intersection (ρj, θj), at which the detected curved lines intersect with one another, the number of the curved lines, which intersect with one another at each of said points of intersection (ρj, θj), being then counted with respect to each of said points of intersection (ρj, θj), extracting a predetermined number of the points of intersection (ρj, θj) in the order of decreasing count value, and detecting a reference candidate line on said orthogonal coordinate system, said reference candidate line corresponding to each of said extracted points of intersection (ρj, θj) and being defined by Formula (2):

$$\rho j = xi \cos \theta j + yi \sin \theta j \quad (2)$$

a plurality of the reference candidate lines, which correspond to said extracted points of intersection (ρj, θj), being thereby detected, and iii) an irradiation field determining means for determining that a region surrounded by the plurality of said reference candidate lines defined by Formula (2), which have been detected by said reference candidate line detecting means, is the irradiation field;

iv) an evaluation means for making evaluation, which utilizes a predetermined evaluation function, with respect to each of said reference candidate lines defined by Formula (2), which have been detected by said reference candidate line detecting means, and v) a candidate line detecting means for detecting predetermined candidate lines in accordance with the results of said evaluation having been made by said evaluation means, said predetermined candidate lines being detected from said reference candidate lines or in lieu of said reference candidate lines, and said irradiation field determining means determines that a region surrounded by said predetermined candidate lines, in lieu of said reference candidate lines is the irradiation field;

wherein said evaluation means makes a judgment for each of said reference candidate lines defined by Formula (2) as to whether a predetermined representative point, which has been set previously as a point lying on said irradiation field contour, lies or does not lie on the reference candidate line, and said candidate line detecting means detects, as said predetermined candidate lines, the reference candidate lines, which are among said reference candidate lines defined by Formula (2) and for which it has been judged that the corresponding predetermined representative points lie thereon.

7. An apparatus for recognizing an irradiation field on a radiation image, in which an image signal representing a radiation image is obtained, the radiation image having been recorded by use of a collimation plate and having an irradiation field thereon, and a process for recognizing the irradiation field is carried out, the irradiation field being recognized in accordance with the image signal, the apparatus comprising:

i) an edge candidate point detecting means for setting a plurality of radial straight lines extending from a predetermined point, which lies within the irradiation field, toward ends of the radiation image, and detecting an edge candidate point with respect to each of said set radial straight lines and in accordance with values of the image signal, which correspond to positions located along the radial straight line, said edge candidate point being considered to constitute a contour of the irradiation field on the radial straight line, a plurality of edge candidate points being thereby detected with respect to the plurality of said radial straight lines, ii) a reference candidate line detecting means for:

detecting a curved line, which may be represented by Formula (1), with respect to each of said edge candidate points having been detected by said edge candidate point detecting means:

$$\rho = xi \cos \theta + yi \sin \theta \quad (1)$$

wherein coordinates of each of said edge candidate points on an orthogonal coordinate system having been set in the plane of the radiation image are represented by (xi, yi), and xi and yi are taken as fixed values, a plurality of curved lines being thereby found with respect to the plurality of said edge candidate points, detecting points of intersection (ρj, θj), at which the detected curved lines intersect with one another, the number of the curved lines, which intersect with one another at each of said points of intersection (ρj, θj), being then counted with respect to each of said points of intersection (ρj, θj), extracting a predetermined number of the points of intersection (ρj, θj) in the order of decreasing count value, and detecting a reference candidate line on said orthogonal coordinate system, said reference candidate line corresponding to each of said extracted points of intersection (ρj, θj) and being defined by Formula (2):

$$\rho j = xi \cos \theta j + yi \sin \theta j \quad (2)$$

a plurality of the reference candidate lines, which correspond to said extracted points of intersection (ρj, θj), being thereby detected, and iii) an irradiation field determining means for determining that a region surrounded by the plurality of said reference candidate lines defined by Formula (2), which have been detected by said reference candidate line detecting means, is the irradiation field;

iv) an evaluation means for making evaluation, which utilizes a predetermined evaluation function, with respect to each of said reference candidate lines defined by Formula (2), which have been detected by said reference candidate line detecting means, and v) a candidate line detecting means for detecting predetermined candidate lines in accordance with the results of said evaluation having been made by said evaluation means, said predetermined candidate lines being detected from said reference candidate lines or in lieu of said reference candidate lines, and said irradiation field determining means determines that a region surrounded by said predetermined candidate lines, in lieu of said reference candidate lines is the irradiation field;

wherein said evaluation means comprises:

a) a transformed candidate line setting means for shifting and/or rotating each of said reference candidate lines, which are defined by Formula (2), thereby setting a plurality of transformed candidate lines with respect to each of said reference candidate lines, and b) an evaluation value calculating means for calculating differentiated values with respect to each candidate line, which is among said reference candidate lines and said transformed candidate lines having been set for said reference candidate lines by said transformed candidate line setting means, and calculating a mean value of said differentiated values with respect to each candidate line, said mean value being taken with respect to the direction, along which the candidate line extends, and said candidate line detecting means detects, as said predetermined candidate lines, a predetermined number of the candidate lines in the order of decreasing mean value of differentiated values, in lieu of said reference candidate lines defined by Formula (2).

8. The apparatus for recognizing an irradiation field on a radiation image as defined in claim 7, wherein each of said reference candidate lines is shifted and/or rotated within the range of ±m picture elements and ±α degrees around the reference candidate line, and $\{(2m+1)(2\alpha+1)-1\}$ transformed candidate lines are set with respect to each of said reference candidate line.

9. An apparatus for recognizing an irradiation field on a radiation image, in which an image signal representing a radiation image is obtained, the radiation image having been recorded by use of a collimation plate and having an irradiation field thereon, and a process for recognizing the irradiation field is carried out, the irradiation field being recognized in accordance with the image signal, the apparatus comprising:

i) an edge candidate point detecting means for setting a plurality of radial straight lines extending from a predetermined point, which lies within the irradiation field, toward ends of the radiation image, and detecting an edge candidate point with respect to each of said set radial straight lines and in accordance with values of the image signal, which correspond to positions located along the radial straight line, said edge candidate point being considered to constitute a contour of the irradiation field on the radial straight line, a plurality of edge candidate points being thereby detected with respect to the plurality of said radial straight lines, ii) a reference candidate line detecting means for:

detecting a curved line, which may be represented by Formula (1), with respect to each of said edge candidate points having been detected by said edge candidate point detecting means:

$$\rho = xi \cos \theta + yi \sin \theta \quad (1)$$

wherein coordinates of each of said edge candidate points on an orthogonal coordinate system having been set in the plane of the radiation image are represented by (xi, yi), and xi and yi are taken as fixed values, a plurality of curved lines being thereby found with respect to the plurality of said edge candidate points, detecting points of intersection (ρj, θj), at which the detected curved lines intersect with one another, the number of the curved lines, which intersect with one another at each of said points of intersection (ρj, θj), being then counted with respect to each of said points of intersection (ρj, θj), extracting a predetermined number of the points of intersection (ρj, θj) in the order of decreasing count value, and detecting a reference candidate line on said orthogonal coordinate system, said reference candidate line corresponding to each of said extracted points of intersection (ρj, θj) and being defined by Formula (2):

$$\rho j = xi \cos \theta j + yi \sin \theta j \quad (2)$$

a plurality of the reference candidate lines, which correspond to said extracted points of intersection (ρj, θj), being thereby detected, and iii) an irradiation field determining means for determining that a region surrounded by the plurality of said reference candidate lines defined by Formula (2), which have been detected by said reference candidate line detecting means, is the irradiation field;

iv) an evaluation means for making evaluation, which utilizes a predetermined evaluation function, with respect to each of said reference candidate lines defined by Formula (2), which have been detected by said reference candidate line detecting means, and v) a candidate line detecting means for detecting predetermined candidate lines in accordance with the results of said evaluation having been made by said evaluation means, said predetermined candidate lines being detected from said reference candidate lines or in lieu of said reference candidate lines, and said irradiation field determining means determines that a region surrounded by said predetermined candidate lines, in lieu of said reference candidate lines is the irradiation field; wherein said evaluation means comprises:

a) a transformed candidate line setting means for shifting and/or rotating each of said reference candidate lines, which are defined by Formula (2), and thereby setting a plurality of transformed candidate lines with respect to each of said reference candidate lines, and b) an evaluation value calculating means for finding directions of image density gradient vectors with respect to each candidate line, which is among said reference candidate lines and said transformed candidate lines having been set for said reference candidate lines by said transformed candidate line setting means, and calculating an entropy of said directions of image density gradient vectors with respect to each candidate line, said entropy being taken with respect to the direction, along which the candidate line extends, and said candidate line detecting means detects, as said predetermined candidate lines, a predetermined number of the candidate lines in the order of increasing entropy, in lieu of said reference candidate lines defined by Formula (2).

10. The apparatus for recognizing an irradiation field on a radiation image as defined in claim 9, wherein each of said reference candidate lines is shifted and/or rotated within the range of ±m picture elements and ±α degrees around the reference candidate line, and $\{(2m+1)(2\alpha+1)-1\}$ transformed candidate lines are set with respect to each of said reference candidate line.

11. A blackening processing method for a radiation image, in which an image signal representing a radiation image is obtained, the radiation image having been recorded by use of a collimation plate and having an irradiation field thereon, and the image signal is processed such that a region outside of the irradiation field may have approximately the highest level of image density or approximately the lowest level of luminance, wherein the improvement comprises applying, as the irradiation field, an irradiation field having been determined by a method of recognizing an irradiation field on a radiation image, in which an image signal representing a radiation image is obtained, the radiation image having been recorded by use of a collimation plate and having an irradiation field thereon, and a process for recognizing the irradiation field is carried out, the irradiation field being recognized in accordance with the image signal, the method of recognizing an irradiation field on a radiation image comprising the steps of:

i) setting a plurality of radial straight lines extending from a predetermined point, which lies within the irradiation field, toward ends of the radiation image, ii) detecting an edge candidate point with respect to each of said set radial straight lines and in accordance with values of the image signal, which correspond to positions located along the radial straight line, said edge candidate point being considered to constitute a contour of the irradiation field on the radial straight line, a plurality of edge candidate points being thereby detected with respect to the plurality of said radial straight lines, iii) detecting a curved line, which may be represented by Formula (1), with respect to each of said edge candidate points:

$$\rho = xi \cos \theta + yi \sin \theta \quad (1)$$

wherein coordinates of each of said edge candidate points on an orthogonal coordinate system having been set in the plane of the radiation image are represented by (xi, yi), and xi and yi are taken as fixed values, a plurality of curved lines being thereby found with respect to the plurality of said edge candidate points, iv) detecting points of intersection ($\rho j$, $\theta j$), at which the detected curved lines intersect with one another, the number of the curved lines, which intersect with one another at each of said points of intersection ($\rho j$, $\theta j$), being then counted with respect to each of said points of intersection ($\rho j$, $\theta j$), v) extracting a predetermined number of the points of intersection ($\rho j$, $\theta j$) in the order of decreasing count value, vi) detecting a reference candidate line on said orthogonal coordinate system, said reference candidate line corresponding to each of said extracted points of intersection ($\rho j$, $\theta j$) and being defined by Formula (2):

$$\rho j = x \cos \theta j + y \sin \theta j \quad (2)$$

a plurality of the reference candidate lines, which correspond to said extracted points of intersection ($\rho j$, $\theta j$), being thereby detected, and vii) determining that a region surrounded by the plurality of said reference candidate lines defined by Formula (2) is the irradiation field.

12. A blackening processing method for a radiation image as defined in claim 11 wherein, in the method of recognizing an irradiation field on a radiation image, evaluation utilizing a predetermined evaluation function is made with respect to each of said reference candidate lines defined by Formula (2), predetermined candidate lines are detected in accordance with the results of said evaluation, said predetermined candidate lines being detected from said reference candidate lines or in lieu of said reference candidate lines, and it is determined that a region surrounded by said predetermined candidate lines, in lieu of said reference candidate lines, is the irradiation field.

13. A blackening processing method for a radiation image as defined in claim 12 wherein the evaluation utilizing said predetermined evaluation function is made by making a judgment for each of said reference candidate lines defined by Formula (2) as to whether a predetermined representative point, which has been set previously as a point lying on said irradiation field contour, lies or does not lie on the reference candidate line, and said predetermined candidate lines are the reference candidate lines, which are among said reference candidate lines defined by Formula (2) and for which it has been judged that the corresponding predetermined representative points lie thereon.

14. A blackening processing method for a radiation image as defined in claim 12 wherein the evaluation utilizing said predetermined evaluation function is made by shifting and/or rotating each of said reference candidate lines, which are defined by Formula (2), thereby setting a plurality of transformed candidate lines with respect to each of said reference candidate lines, calculating differentiated values with respect to each candidate line, which is among said reference candidate lines and said transformed candidate lines having been set for said reference candidate lines, and calculating a mean value of said differentiated values with respect to each candidate line, said mean value being taken with respect to the direction, along which the candidate line extends, and said predetermined candidate lines are a predetermined total number of the reference candidate lines and the transformed candidate lines, which have been selected in the order of decreasing mean value of differentiated values, in lieu of said reference candidate lines defined by Formula (2).

15. The blackening process method for a radiation image as defined in claim 14, wherein said shifting and/or rotating each of said reference candidate lines, is within the range of ±m picture elements and ±α degrees around the reference candidate line, and {(2m+1)(2=+1)−1 } transformed candidate lines are set with respect to each of said reference candidate lines.

16. A blackening processing method for a radiation image as defined in claim 12 wherein the evaluation utilizing said predetermined evaluation function is made by shifting and/or rotating each of said reference candidate lines, which are defined by Formula (2), thereby setting a plurality of transformed candidate lines with respect to each of said reference candidate lines, finding directions of image density gradient vectors with respect to each candidate line, which is among said reference candidate lines and said transformed candidate lines having been set for said reference candidate lines, and calculating an entropy of said directions of image density gradient vectors with respect to each candidate line, said entropy being taken with respect to the direction, along which the candidate line extends, and said predetermined candidate lines are a predetermined total number of the reference candidate lines and the transformed candidate lines, which have been selected in the order of increasing entropy, in lieu of said reference candidate lines defined by Formula (2).

17. The blackening process method for a radiation image as defined in claim 16, wherein said shifting and/or rotating each of said reference candidate lines, is within the range of ±m picture elements and ±α degrees around the reference candidate line, and {(2m+1)(2α+1)−1} transformed candidate lines are set with respect to each of said reference candidate lines.

18. A blackening processing apparatus for a radiation image, in which an image signal representing a radiation image is obtained, the radiation image having been recorded by use of a collimation plate and having an irradiation field thereon, and the image signal is processed such that a region outside of the irradiation field may have approximately the highest level of image density or approximately the lowest level of luminance, wherein the improvement comprises applying, as the irradiation field, an irradiation field having been determined by an apparatus for recognizing an irradiation field on a radiation image, in which an image signal representing a radiation image is obtained, the radiation image having been recorded by use of a collimation plate and having an irradiation field thereon, and a process for recognizing the irradiation field is carried out, the irradiation field being recognized in accordance with the image signal, the apparatus for recognizing an irradiation field on a radiation image comprising:

i) an edge candidate point detecting means for setting a plurality of radial straight lines extending from a predetermined point, which lies within the irradiation field, toward ends of the radiation image, and detecting an edge candidate point with respect to each of said set radial straight lines and in accordance with values of the image signal, which correspond to positions located along the radial straight line, said edge candidate point being considered to constitute a contour of the irradiation field on the radial straight line, a plurality of edge candidate points being thereby detected with respect to the plurality of said radial straight lines, ii) a reference candidate line detecting means for:
detecting a curved line, which may be represented by Formula (1), with respect to each of said edge candidate points having been detected by said edge candidate point detecting means:

$$\rho = xi \cos \theta + yi \sin \theta \quad (1)$$

wherein coordinates of each of said edge candidate points on an orthogonal coordinate system having been set in the plane of the radiation image are represented by (xi, yi), and xi and yi are taken as fixed values, a plurality of curved lines being thereby found with respect to the plurality of said edge candidate points, detecting points of intersection (ρj, θj), at which the detected curved lines intersect with one another, the number of the curved lines, which intersect with one another at each of said points of intersection (ρj, θj), being then counted with respect to each of said points of intersection (ρj, θj), extracting a predetermined number of the points of intersection (ρj, θj) in the order of decreasing count value, and detecting a reference candidate line on said orthogonal coordinate system, said reference candidate line corresponding to each of said extracted points of intersection (ρj, θj) and being defined by Formula (2):

$$\rho j = x \cos \theta j + y \sin \theta j \quad (2)$$

a plurality of the reference candidate lines, which correspond to said extracted points of intersection (ρj, θj), being thereby detected, and iii) an irradiation field determining means for determining that a region surrounded by the plurality of said reference candidate lines defined by Formula (2), which have been detected by said reference candidate line detecting means, is the irradiation field.

19. A blackening processing apparatus for a radiation image as defined in claim 18 wherein the apparatus for recognizing an irradiation field on a radiation image further comprises:

an evaluation means for making evaluation, which utilizes a predetermined evaluation function, with respect to each of said reference candidate lines defined by Formula (2), which have been detected by said reference candidate line detecting means, and a candidate line detecting means for detecting predetermined candidate lines in accordance with the results of said evaluation having been made by said evaluation means, said predetermined candidate lines being detected from said reference candidate lines or in lieu of said reference candidate lines, and said irradiation field determining means determines that a region surrounded by said predetermined candidate lines, in lieu of said reference candidate lines, is the irradiation field.

20. A blackening processing apparatus for a radiation image as defined in claim 19 wherein said evaluation means makes a judgment for each of said reference candidate lines defined by Formula (2) as to whether a predetermined representative point, which has been set previously as a point lying on said irradiation field contour, lies or does not lie on the reference candidate line, and said candidate line detecting means detects, as said predetermined candidate lines, the reference candidate lines, which are among said reference candidate lines defined by Formula (2) and for which it has been judged that the corresponding predetermined representative points lie thereon.

21. A blackening processing apparatus for a radiation image as defined in claim 19 wherein said evaluation means comprises:

a transformed candidate line setting means for shifting and/or rotating each of said reference candidate lines, which are defined by Formula (2), and thereby setting a plurality of transformed candidate lines with respect to each of said reference candidate lines, and b) an evaluation value calculating means for finding directions of image density gradient vectors with respect to each candidate line, which is among said reference candidate lines and said transformed candidate lines having been set for said reference candidate lines by said transformed candidate line setting means, and calculating an entropy of said directions of image density gradient vectors with respect to each candidate line, said entropy being taken with respect to the direction, along which the candidate line extends, and said candidate line detecting means detects, as said predetermined candidate lines, a predetermined number of the candidate lines in the order of increasing entropy, in lieu of said reference candidate lines defined by Formula (2).

22. The blackening process apparatus for recognizing an irradiation field on a radiation image as defined in claim 21, wherein each of said reference candidate lines is shifted and/or rotated within the range of ±m picture elements and ±α degrees around the reference candidate line, and {(2m+

1)(2α+1)−1} transformed candidate lines are set with respect to each of said reference candidate line.

23. A blackening processing apparatus for a radiation image as defined in claim 19 wherein said evaluation means comprises:
  a) a transformed candidate line setting means for shifting and/or rotating each of said reference candidate lines, which are defined by Formula (2), and thereby setting a plurality of transformed candidate lines with respect to each of said reference candidate lines, and
  b) an evaluation value calculating means for calculating differentiated values with respect to each candidate line, which is among said reference candidate lines and said transformed candidate lines having been set for said reference candidate lines by said transformed candidate line setting means, and calculating a mean value of said differentiated values with respect to each candidate line, said mean value being taken with respect to the direction, along which the candidate line extends, and said candidate line detecting means detects, as said predetermined candidate lines, a predetermined number of the candidate lines in the order of decreasing mean value of differentiated values, in lieu of said reference candidate lines defined by Formula (2).

24. The blackening process apparatus for recognizing an irradiation field on a radiation image as defined in claim 23, wherein each of said reference candidate lines is shifted and/or rotated within the range of ±m picture elements and ±α degrees around the reference candidate line, and {(2m+1)(2α+1)−1} transformed candidate lines are set with respect to each of said reference candidate line.

* * * * *